(12) United States Patent
Sells et al.

(10) Patent No.: US 9,660,463 B2
(45) Date of Patent: May 23, 2017

(54) APPARATUS COMPRISING POWER STRIP AND BATTERY

(71) Applicant: Q Holdings LLC, New York, NY (US)

(72) Inventors: Denyveaus Sells, New York, NY (US); Faris Elmasu, New York, NY (US); Nathan Meryash, New York, NY (US); Timothy Connelly, New York, NY (US)

(73) Assignee: Q Holdings LLC, New York, NY (US)

( * ) Notice: Subject to any disclaimer, the term of this patent is extended or adjusted under 35 U.S.C. 154(b) by 68 days.

(21) Appl. No.: 14/062,587

(22) Filed: Oct. 24, 2013

(65) Prior Publication Data
US 2014/0111143 A1   Apr. 24, 2014

Related U.S. Application Data

(60) Provisional application No. 61/717,813, filed on Oct. 24, 2012, provisional application No. 61/774,838, filed on Mar. 8, 2013.

(51) Int. Cl.
*H02J 7/00* (2006.01)
(52) U.S. Cl.
CPC .......... *H02J 7/0029* (2013.01); *H02J 7/0042* (2013.01); *H02J 7/0045* (2013.01); *H02J 7/0047* (2013.01); *H02J 2007/0062* (2013.01)
(58) Field of Classification Search
CPC ....... Y02E 60/12; H02J 7/0042; H02J 7/0045; H01M 10/46; H01M 10/44
USPC ........................................................ 320/107
See application file for complete search history.

(56) References Cited

U.S. PATENT DOCUMENTS

| | | | |
|---|---|---|---|
| 2002/0002593 A1* | 1/2002 | Ewing et al. | 709/212 |
| 2007/0236181 A1* | 10/2007 | Palladino | 320/130 |
| 2007/0257560 A1 | 11/2007 | Menas et al. | |
| 2009/0099505 A1* | 4/2009 | Hendrixson et al. | 604/48 |
| 2010/0090654 A1* | 4/2010 | Breiting et al. | 320/137 |
| 2011/0025263 A1* | 2/2011 | Gilbert | 320/108 |
| 2011/0193523 A1* | 8/2011 | Law | H02J 7/0047 |
| | | | 320/113 |
| 2012/0019207 A1 | 1/2012 | Kuo et al. | |

(Continued)

FOREIGN PATENT DOCUMENTS

EP    1 653 572 A1    5/2006

OTHER PUBLICATIONS

Online Article Jul. 10, 2012, Super High Capacity External Rechargeable Battery Pack—BP160, 13 pages.
(Continued)

*Primary Examiner* — Arun Williams
(74) *Attorney, Agent, or Firm* — Hard IP LLC

(57) ABSTRACT

An exemplary aspect comprises an apparatus, comprising: a cord component connected to a plug component at a first end; a power strip component connected to the cord component at a second end of the cord component; the power strip component comprising one or more USB dedicated charge ports and one or more AC outlets; a charging cavity within the power strip component suitable to receive a removable battery having a battery electrical contact; and a power strip electrical contact located in the charging cavity that connects with the battery electrical contact and charges the battery when the battery is inserted into the charging cavity of the power strip component.

10 Claims, 33 Drawing Sheets

(56) References Cited

U.S. PATENT DOCUMENTS

| | | | | |
|---|---|---|---|---|
| 2012/0187902 A1* | 7/2012 | Wang | .................. | H02J 7/00 320/107 |
| 2013/0015714 A1* | 1/2013 | Kwok | .................. | 307/75 |
| 2013/0278214 A1* | 10/2013 | Satoh | .................. | 320/109 |

OTHER PUBLICATIONS

The above references were cited the International Search Report of PCT/US2013/066618 of Feb. 13, 2013.

* cited by examiner

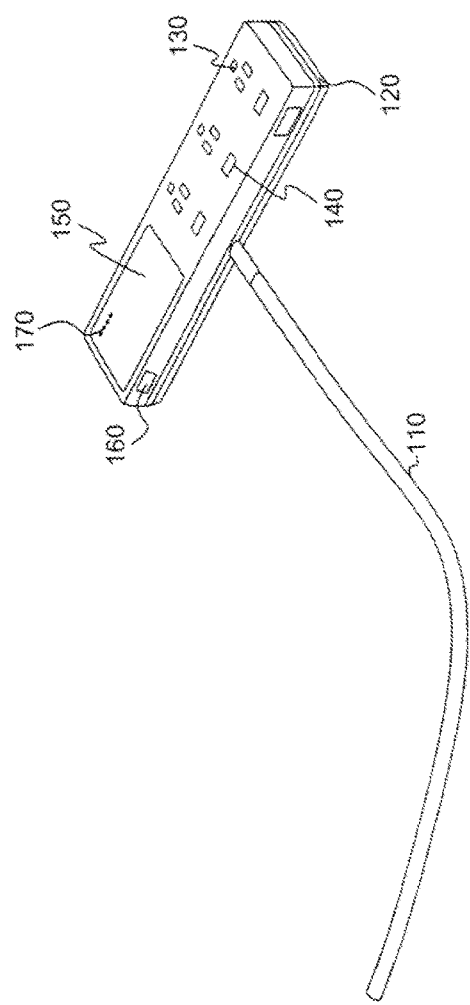

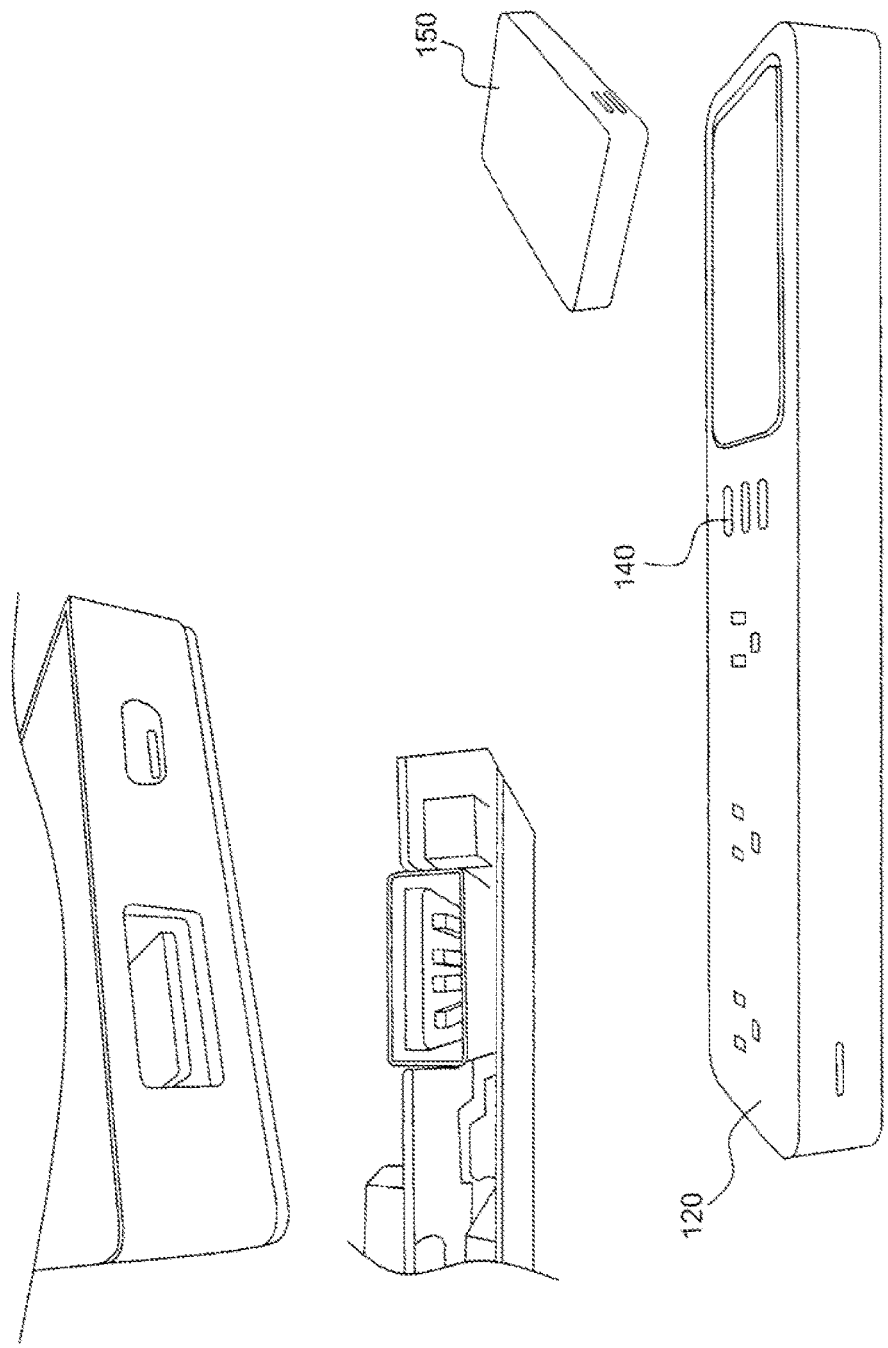

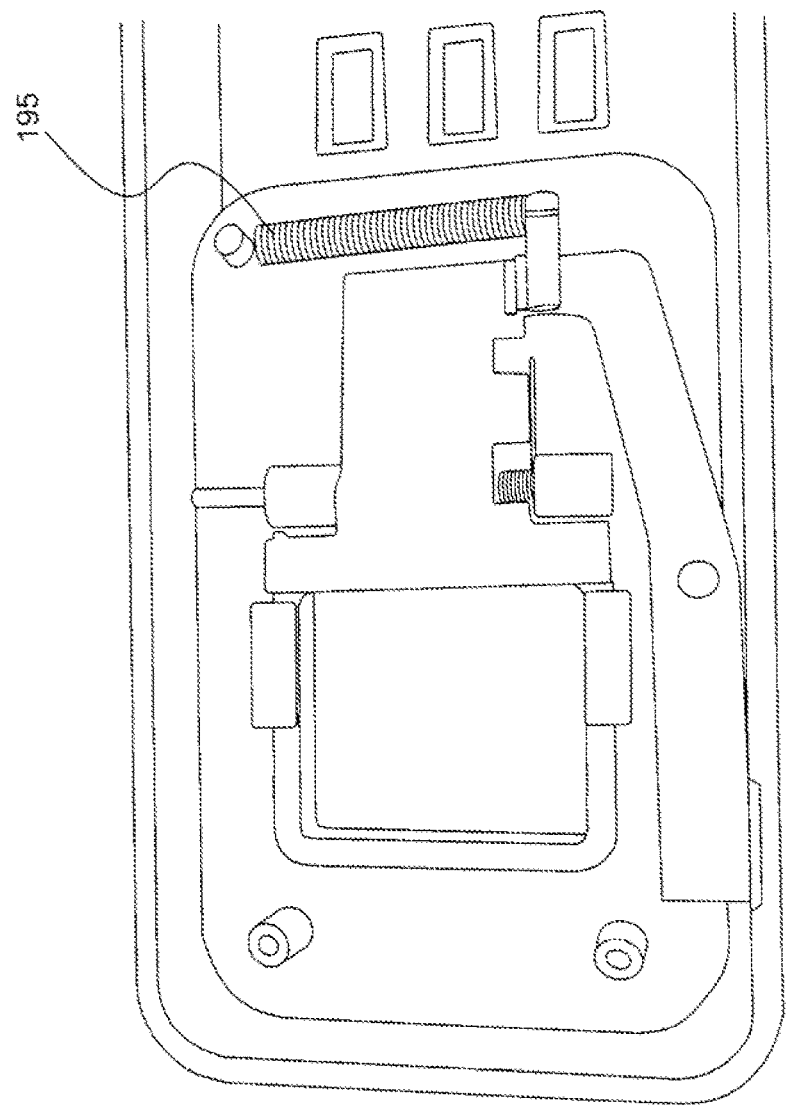

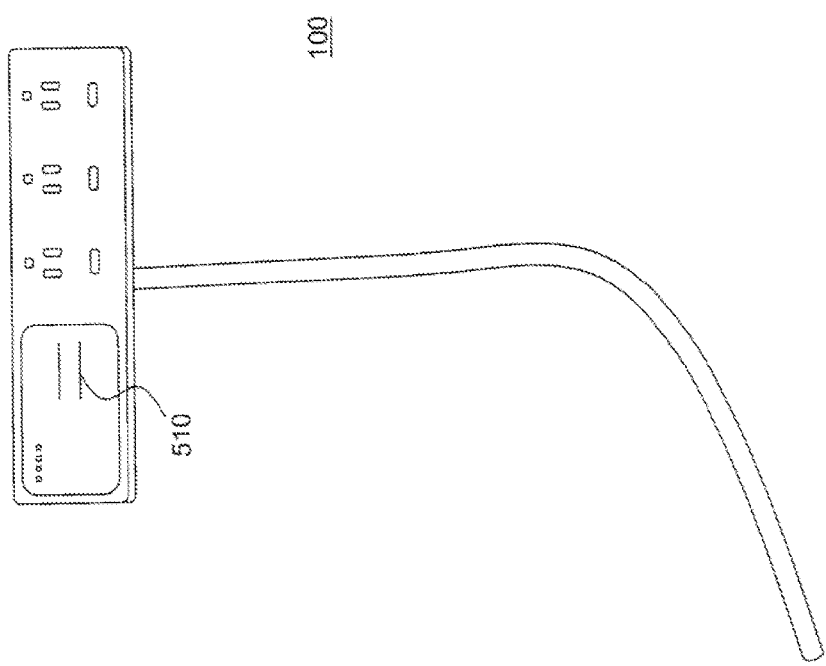

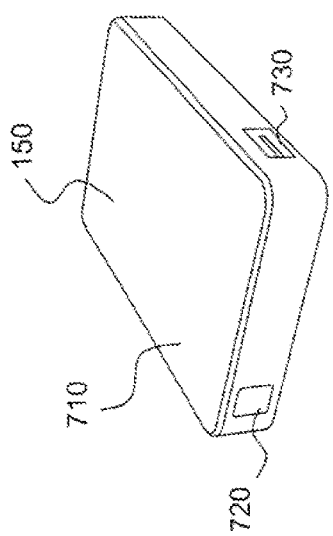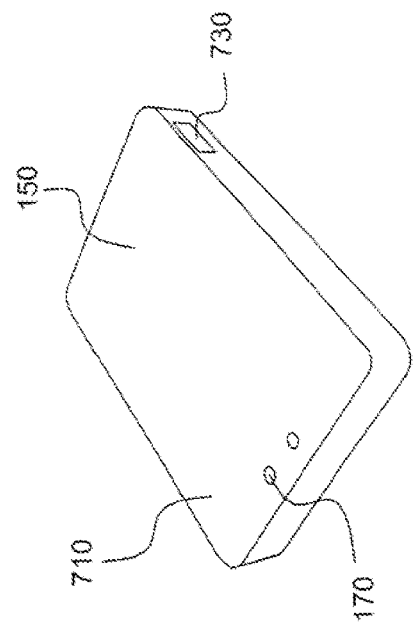
FIG. 7A

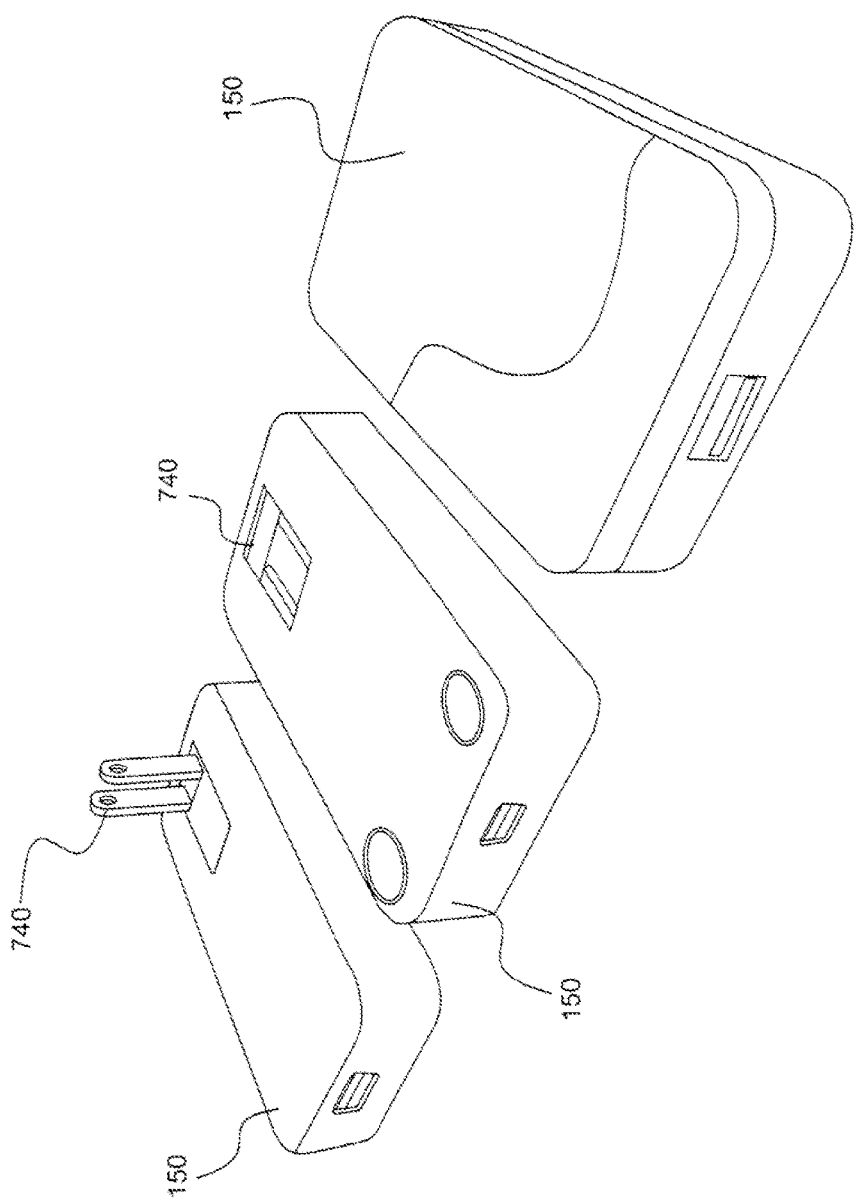

APPARATUS COMPRISING POWER STRIP AND BATTERY

CROSS-REFERENCE TO RELATED APPLICATIONS

This application claims priority under 35 U.S.C. 119(e) to U.S. Provisional Patent Application No. 61/717,813, filed Oct. 24, 2012, entitled "Apparatus Comprising Power Strip and Battery" and to U.S. Provisional Patent Application No. 61/774,838, filed Mar. 8, 2013, entitled "Apparatus Comprising Power Strip and Battery." The entire contents of each of the above-referenced applications are incorporated herein by reference.

INTRODUCTION

An exemplary embodiment comprises a power strip having one or more AC power outlets, one or more USB dedicated charge ports, and at least one connector for charging a battery suitable for use as a portable power supply for a mobile device.

More specifically, an exemplary aspect may comprise an apparatus comprising: a cord component connected to a plug component at a first end; a power strip component connected to the cord component at a second end of the cord component; the power strip component comprising one or more USB dedicated charge ports and one or more AC outlets; a charging cavity within the power strip component suitable to receive a removable battery having a battery electrical contact; and a power strip electrical contact located in the charging cavity that connects with the battery electrical contact and charges the battery when the battery is inserted into the charging cavity of the power strip component.

In one or more exemplary apparatus embodiments: (1) the power strip component comprises an indicator light that provides a visual indication that the power strip component is receiving electricity through the cord component; (2) the power strip component comprises a power strip electrical contact comprising at least one of a leaf spring connector outlet, a blade connector outlet and a pogo pin outlet for charging the battery; (3) the power strip component comprises a power strip housing made of at least one of a Thermoplastic Elastomer (TPE) and Acrylonitrile Butadiene Styrene (ABS); (4) the power strip component comprises a power strip housing having silicone pads on a base of the power strip housing; (5) the battery comprises an indicator light that provides a visual indication that the battery is receiving electricity from the power strip component; (6) the battery comprises a battery USB dedicated charge port for charging a mobile device, and a battery electrical contact comprising at least one of a leaf spring connector receiving outlet, a blade connector receiving outlet and a pogo pin receiving outlet for charging the battery; (7) the battery comprises a fold-out wall plug to enable charging of the battery separate from the power strip component, the fold-out wall plug connecting with a power strip electrical contact when the battery is inserted into a charging cavity of the power strip component; (8) the battery comprises a DC to DC boost converter circuit, a charge port controller circuit, a microcontroller circuit, an input power management and charging circuit, and a protection circuit; and (9) a spring loading mechanism is located within the charging cavity of the power strip component, wherein the spring loading mechanism is in a locked position when the battery is pressed into the charging cavity of the power strip component, and wherein the battery is released and lifted out of the charging cavity when the spring loading mechanism is activated.

Another exemplary aspect may comprise an apparatus comprising: a housing; a battery electrical contact extending through an external surface of the housing for receiving electricity; a battery located within the housing for storing the electricity received through the battery electrical contact; and a USB dedicated charge port for charging a mobile device by transferring electricity from the battery to the mobile device, wherein the battery comprises a DC to DC boost converter circuit, a charge port controller circuit, a microcontroller circuit, an input power management and charging circuit, and a protection circuit.

In one or more exemplary apparatus embodiments: (1) the battery electrical contact comprises a fold-out wall plug that receives electricity when inserted into a wall electrical outlet for charging the battery; (2) the DC to DC boost converter circuit adjusts voltage of the battery to a required voltage for charging through the USB dedicated charge port; (3) the charge port controller ensures optimal charge rates and supports charging compatibility of mobile devices; (4) the microcontroller manages a graphical user interface; (5) the microcontroller requests fuel gauge State-of Charge (SoC) data from a battery SoC measurement and charging status monitoring circuit that monitors the battery's fuel gauge; (6) when the SoC data indicates a low charging state, the DC to DC boost converter circuit is disabled; (7) the microcontroller controls an indicator light located on the battery based on the SoC data received from the fuel gauge; (8) the input power management and charging circuit of the battery is configured to pass electricity through to the mobile device without passing electricity through nodes of the battery and electricity not consumed for charging the mobile device charges the battery; and (9) the protection circuit prevents fault conditions and thermal events from damaging the battery.

BRIEF DESCRIPTION OF THE DRAWINGS

FIGS. 1A-1K depict exemplary embodiments of an apparatus comprising a power strip and a battery.

FIG. 5 depicts a top view of an exemplary embodiment of the apparatus.

FIGS. 7A-7C depict exemplary embodiments of the battery.

DETAILED DESCRIPTION OF CERTAIN EXEMPLARY EMBODIMENTS

Figure 1B:
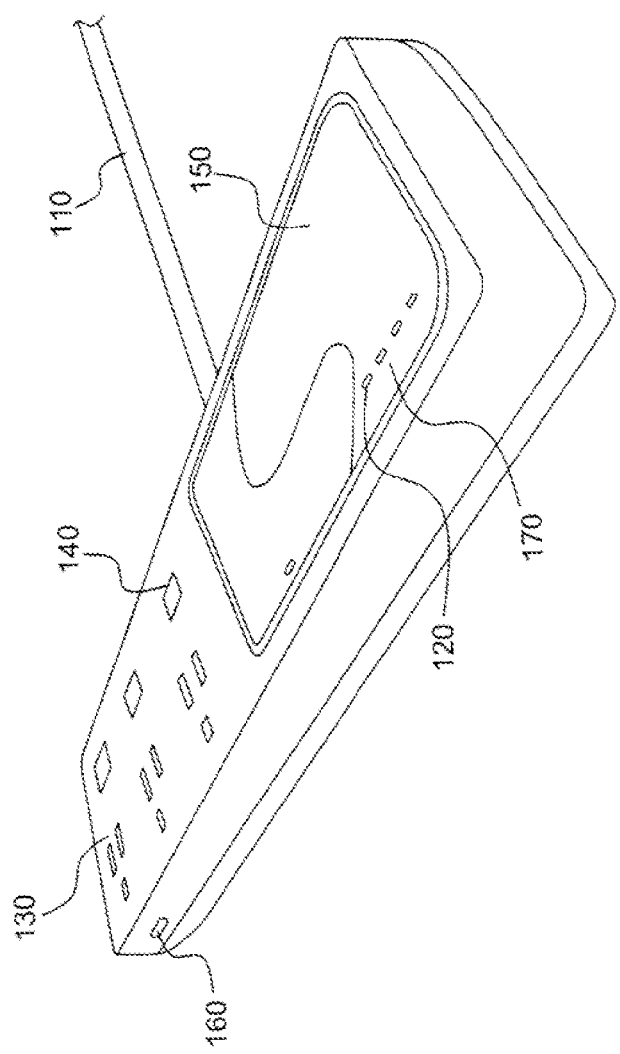

FIGS. 1A-1K depict exemplary embodiments of an apparatus comprising a power strip and a battery. As depicted in FIGS. 1A and 1B, the apparatus 100 may comprise a cord component 110 connected to a plug component (not shown) at a first end. The cord component 110 is connected to a power strip component 120 at a second end of the cord component 110 opposite to the first end.

In an exemplary embodiment, the power strip component 120 comprises a surge protector.

In an exemplary embodiment, the power strip component 120 comprises a plurality of USB dedicated charge ports 140, a plurality of AC outlets 130 and a pogo pin outlet (not shown).

Figure 1C:
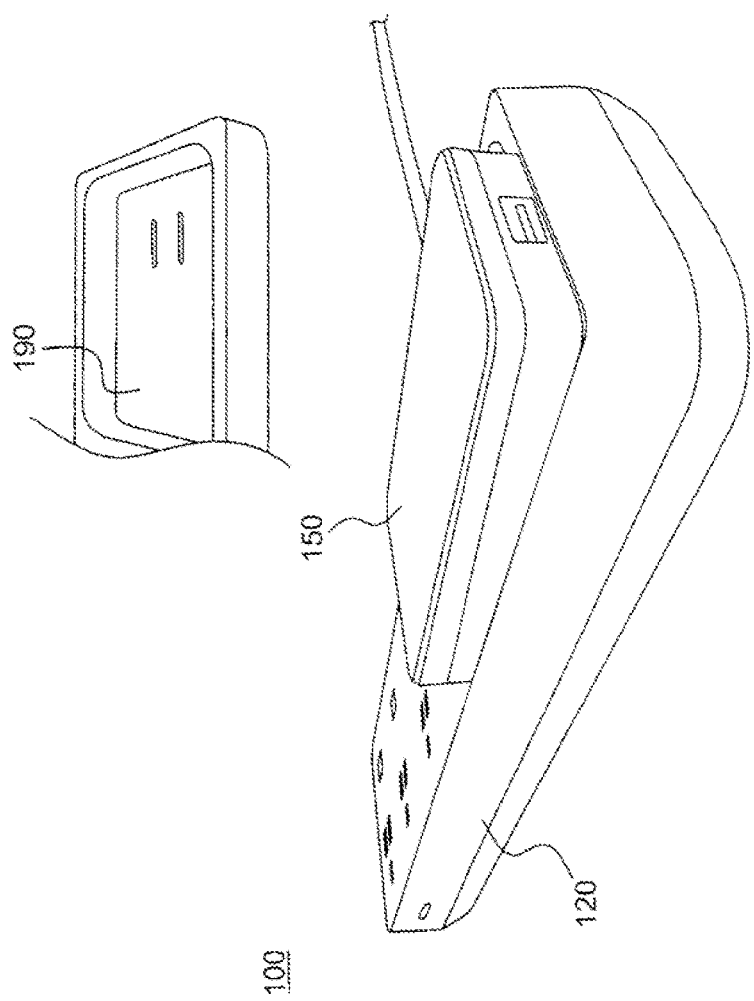

FIG. 1C depicts an exemplary embodiment having a charging cavity 190 suitable to receive a removable portable battery 150 and that is located within the power strip component 120.

Figure 1D:
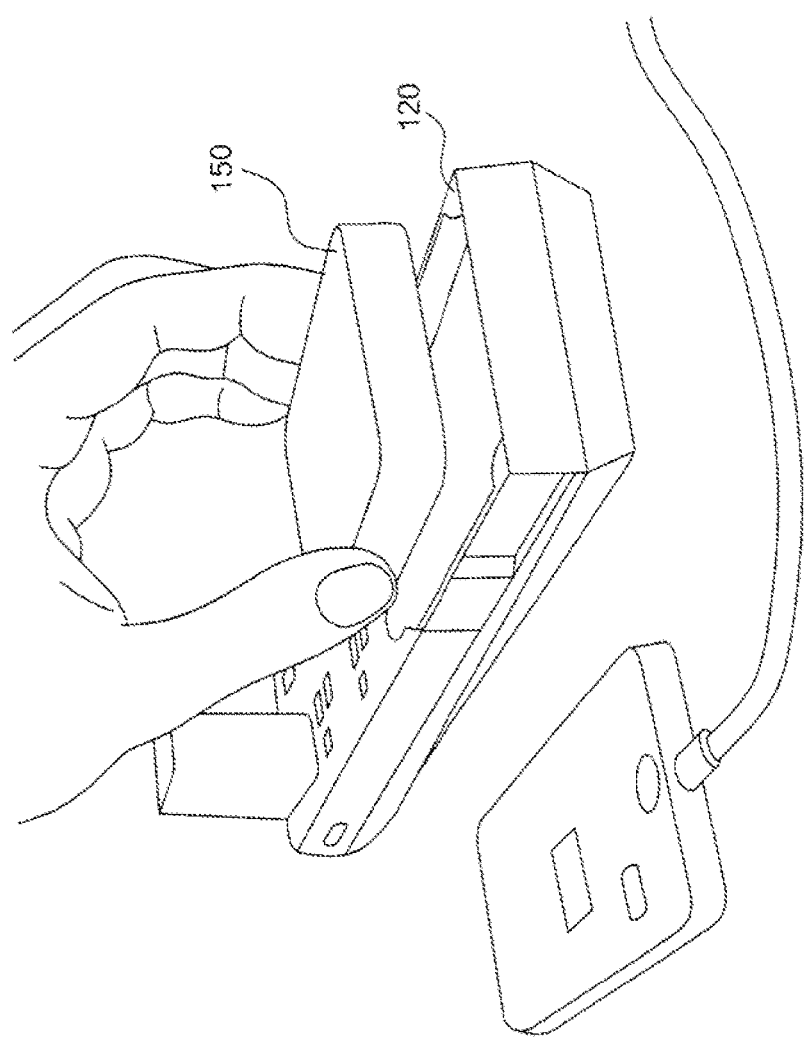

FIG. 1D depicts a user removing the battery 150 from the charging cavity 190. The battery 150 is located within a battery housing. The battery 150 comprises a battery electrical contact 198 (see FIG. 1J) extending through an external surface of the battery housing for receiving electricity from a power strip electrical contact 510 (see FIG. 5) located in the charging cavity 190. That is, the battery electrical contact 198 connects with the power strip electrical contact 510 of the power strip component 120 and electricity is transferred to the battery 150 when the battery 150 is inserted into the charging cavity 190. Exemplary embodiments of the battery electrical contact 198 comprise at least one of a leaf spring connector receiving outlet, a blade connector receiving outlet and a pogo pin receiving outlet.

Figure 1E:
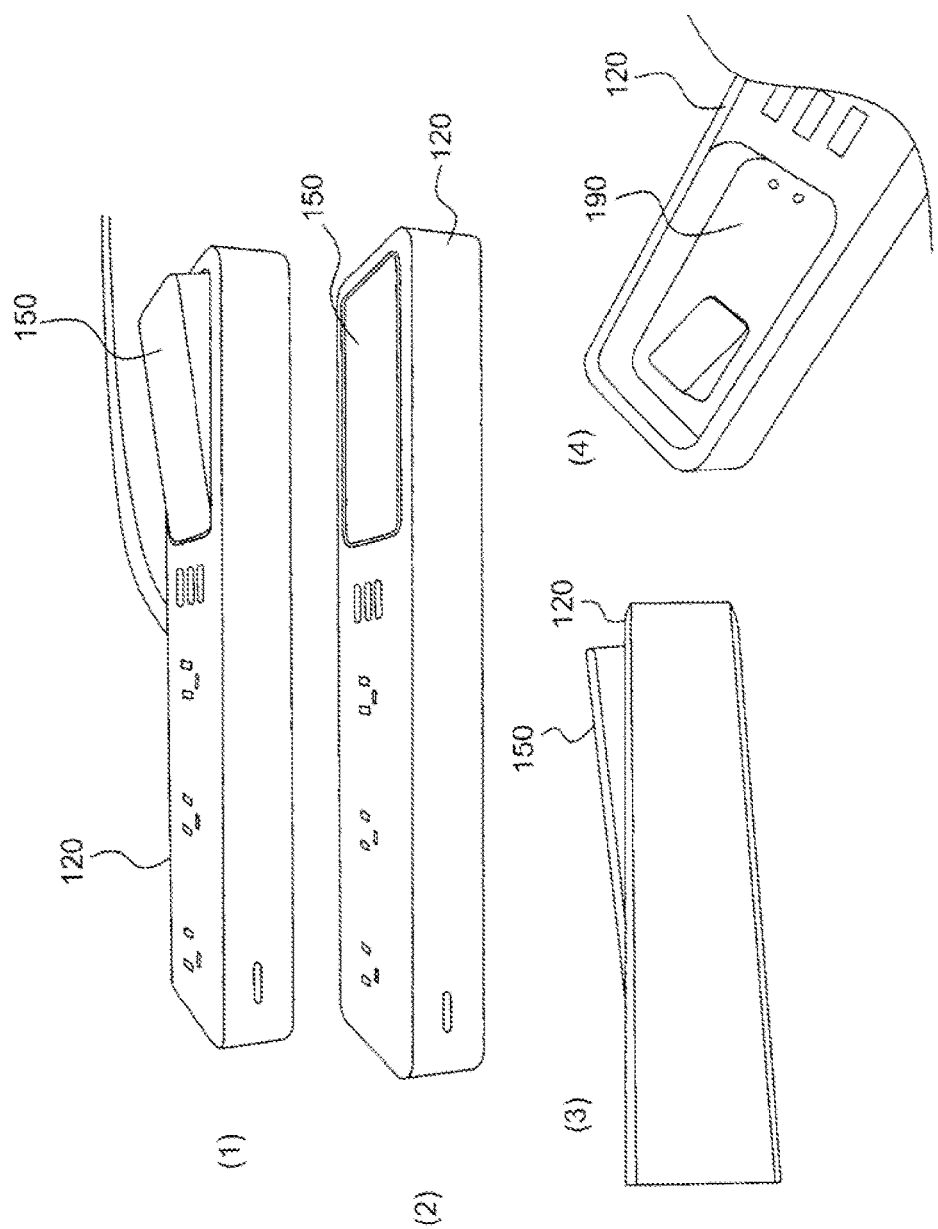

FIG. 1E depicts an exemplary embodiment of the battery 150 partially removed from the charging cavity 190 of the power strip component 120 in image (1) and the battery 150 fully inserted into the charging cavity 190 in image (2). In image (3) of FIG. 1E, the battery 150 is partially removed from the charging cavity 190. In image (4) of FIG. 1E, the battery 150 has been removed from the charging cavity 190.

FIG. 1F depicts an exemplary embodiment of the power strip 120 and the battery 150 comprising the USB dedicated charge ports 140.

Figure 1G:
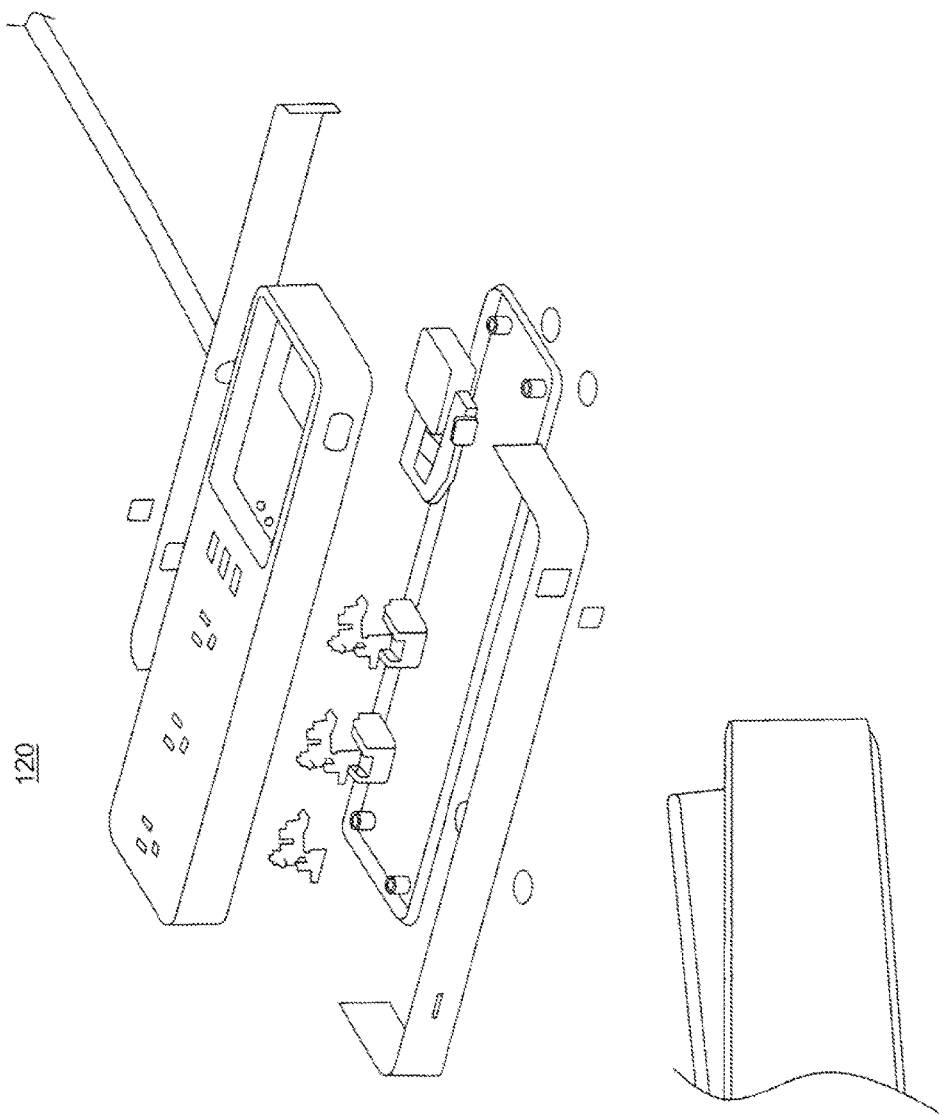

FIG. 1G depicts an exemplary embodiment of the power strip 120 identifying parts, colors, materials and finishes. Part (1) is a top cover with a color of Pantone Q716-1-1, made of a polycarbonate plastic, and finished with a Matte (MT-11000) soft touch. Part (2) is a metal trim with a color of black, made of polycarbonate plastic, and finished with an anodized black horizontal brush. Part (3) is a base with a color of pantone Q716-1-1, made of a polycarbonate plastic, and finished with a matte (MT-11000) soft touch. Part (4) is a battery eject button with a color of black, made of aluminum, and finished with an anodized black horizontal brush. Part (5) refers to silicone feet, with a color of pantone Q716-1-1, made of a High Friction silicone, and finished with a gloss. Part (6) is a power button with a color of black, made of aluminum, and finished with an anodized black horizontal brush. Part (7) is battery pogo pins made of copper. Part (8) is a USB dedicated charge port, with a color of black.

Figure 1I:
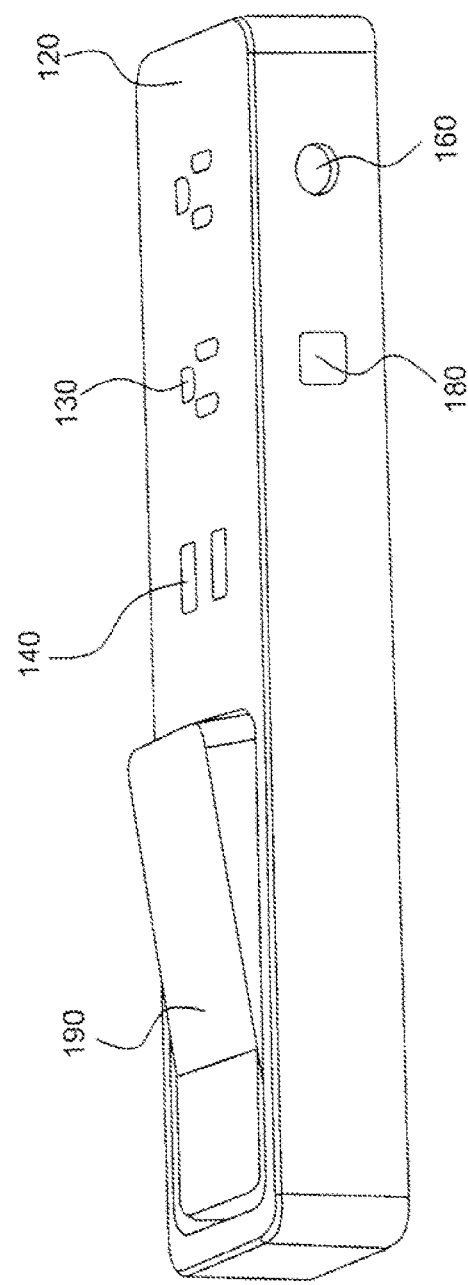

FIG. 1H depicts an exemplary embodiment of the power strip component 120 comprising a spring loading mechanism 195 located within the charging cavity 190. The spring loading mechanism 195 is fully retracted and in a locked position when the battery 150 is pressed into the charging cavity 190 of the power strip component 120. When the spring loading mechanism 195 is activated, the battery 150 is released and lifted out of the charging cavity 190 and the spring loading mechanism is in a fully extended and unlocked position. FIG. 1I depicts an exemplary embodiment of the power strip component 120 with the charging cavity 190 fully extended by the spring loading mechanism 195. The spring loading mechanism 195, in an exemplary embodiment, is dampened such that the battery 150 rises from the charging cavity 190 in a slow and controlled manner.

Those skilled in the art will understand that various known components may be used to implement the spring loading mechanism 195. One example is a press-and-release mechanism similar to that used in certain retractable ink pens. In other embodiments, the battery 150 may be placed in the charging cavity 190 with no additional constraint, may be placed in the charging cavity 190 and held in place with a lever or other constraint, or may be placed in no charging cavity 190.

Figure 1J:
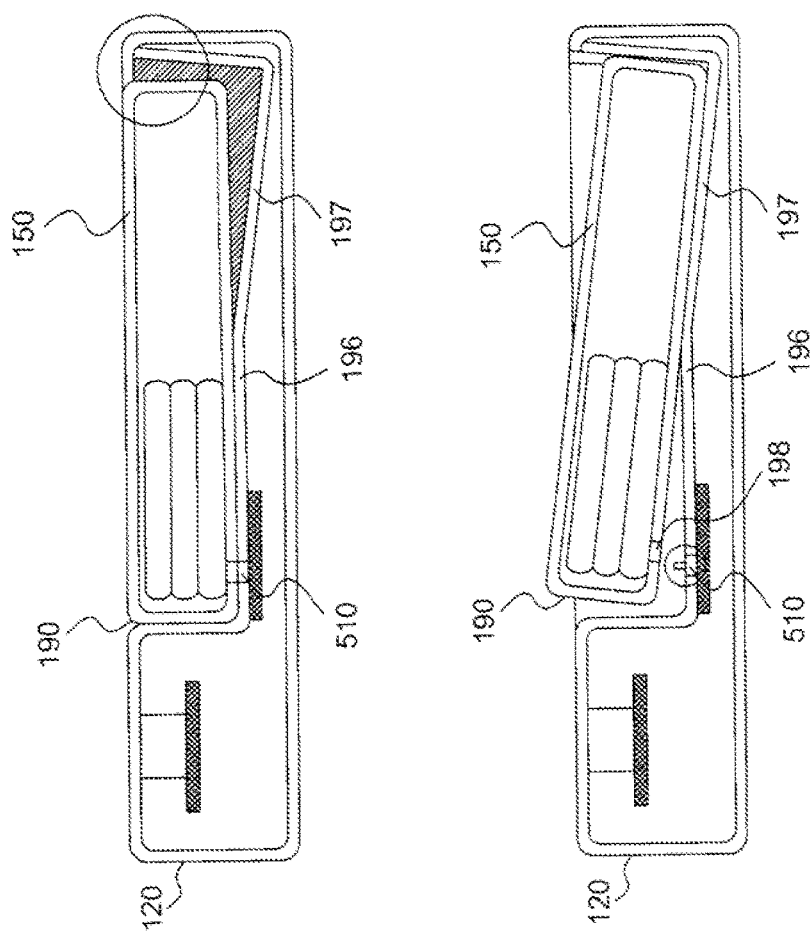

FIG. 1J depicts a cross-sectional view of an exemplary embodiment of the power strip component 120 comprising the charging cavity 190 with no spring loading mechanism. The charging cavity 190 comprises a flat surface 196 and a sloped surface 197. The flat surface 196 comprises the power strip electrical contact 510. The battery 150 rests on the flat surface 196 when inserted into the charging cavity 190 and the power strip electrical contact 510 connects with the battery electrical contact 198, as depicted in image (1) of FIG. 1J. In this embodiment, the power strip electrical contact 510 comprises a pogo pin outlet and the battery electrical contact 198 comprises a pogo pin receiving outlet. The weight of the battery 150 provides sufficient force for the power strip electrical contact 510 and the battery electrical contact 198 to maintain a connection. The sloped surface 197 recedes at an angle away from the flat surface 196 deeper into the charging cavity 190. The sloped surface 197 allows a user to depress a first end of the battery 150 into the charging cavity 190 according to arrow A, lifting a second end of the battery 150 out of the charging cavity 190, as depicted in image (2) of FIG. 1J.

In an exemplary embodiment, the charging cavity 190 is sized larger than the battery 150 to allow the first end of the battery 150 to be depressed into the charging cavity 190.

In an exemplary embodiment, the power strip electrical contact 510 is larger than the battery electrical contact 198 such that the power strip electrical contact 510 and the battery electrical contact 198 maintain a connection, and the battery 150 continues to receive electricity from the power strip component 120, when the battery 150 moves within the charging cavity 190.

Figure 1K:
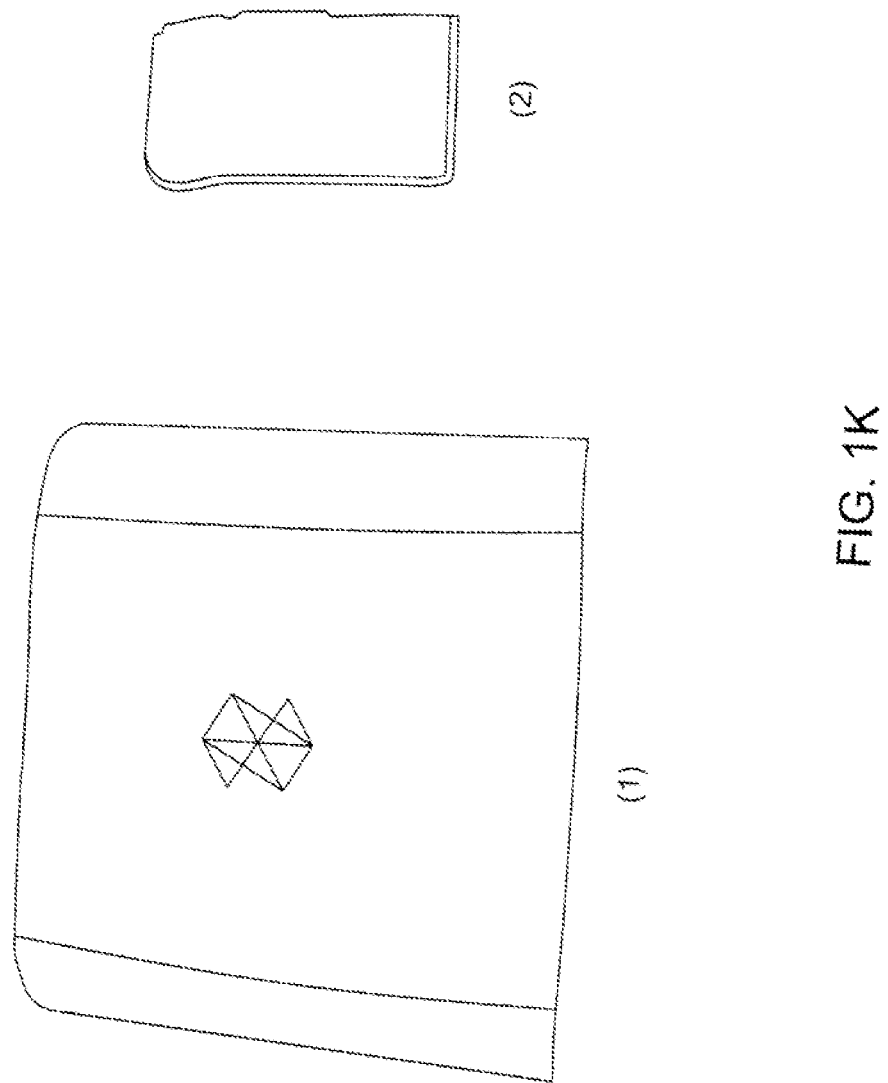

FIG. 1K depicts an exemplary embodiment of materials used to construct housings of the power strip component 120 and the battery 150. That is, in FIG. 1K image (1) depicts an etching finish with an aluminum brush and color finish, while image (2) of FIG. 1K depicts a plastic soft touch color and texture finish.

Figure 2:
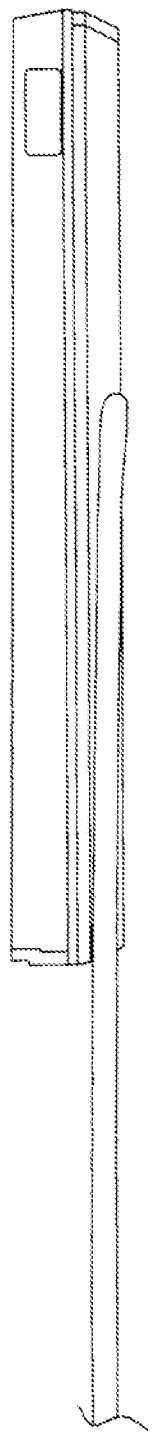
FIGS. 2-4 depict perspective views of the apparatus.
Figure 3:
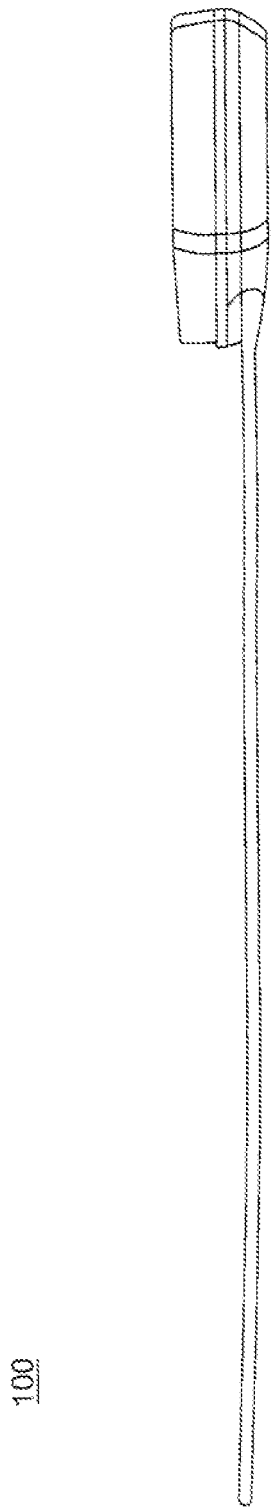
Figure 4:
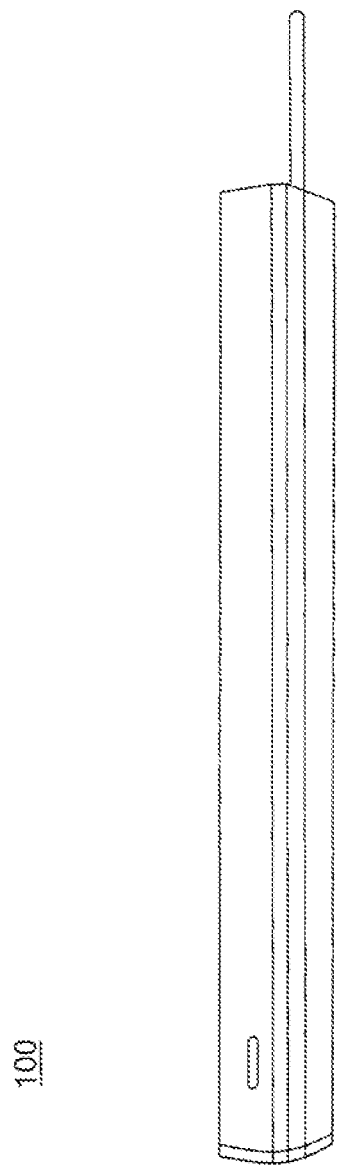

FIGS. 2-4 depict perspective views of the apparatus 100.

FIG. 5 depicts a top view of the apparatus 100 with the battery 150 removed from the charging cavity 190. The power strip component 120, in an exemplary embodiment, comprises the power strip electrical contact 510 located in the charging cavity 190 that charges the battery 150 when the battery 150 is inserted into the charging cavity 190. Exemplary embodiments of the power strip electrical contact 510 may comprise a leaf spring connector, a blade connector and/or a pogo pin outlet.

Other embodiments may use inductive charging (for example, similar to that used in Duracell's Powermat), or other charging mechanisms known to those of ordinary skill in the art.

Figure 6A:
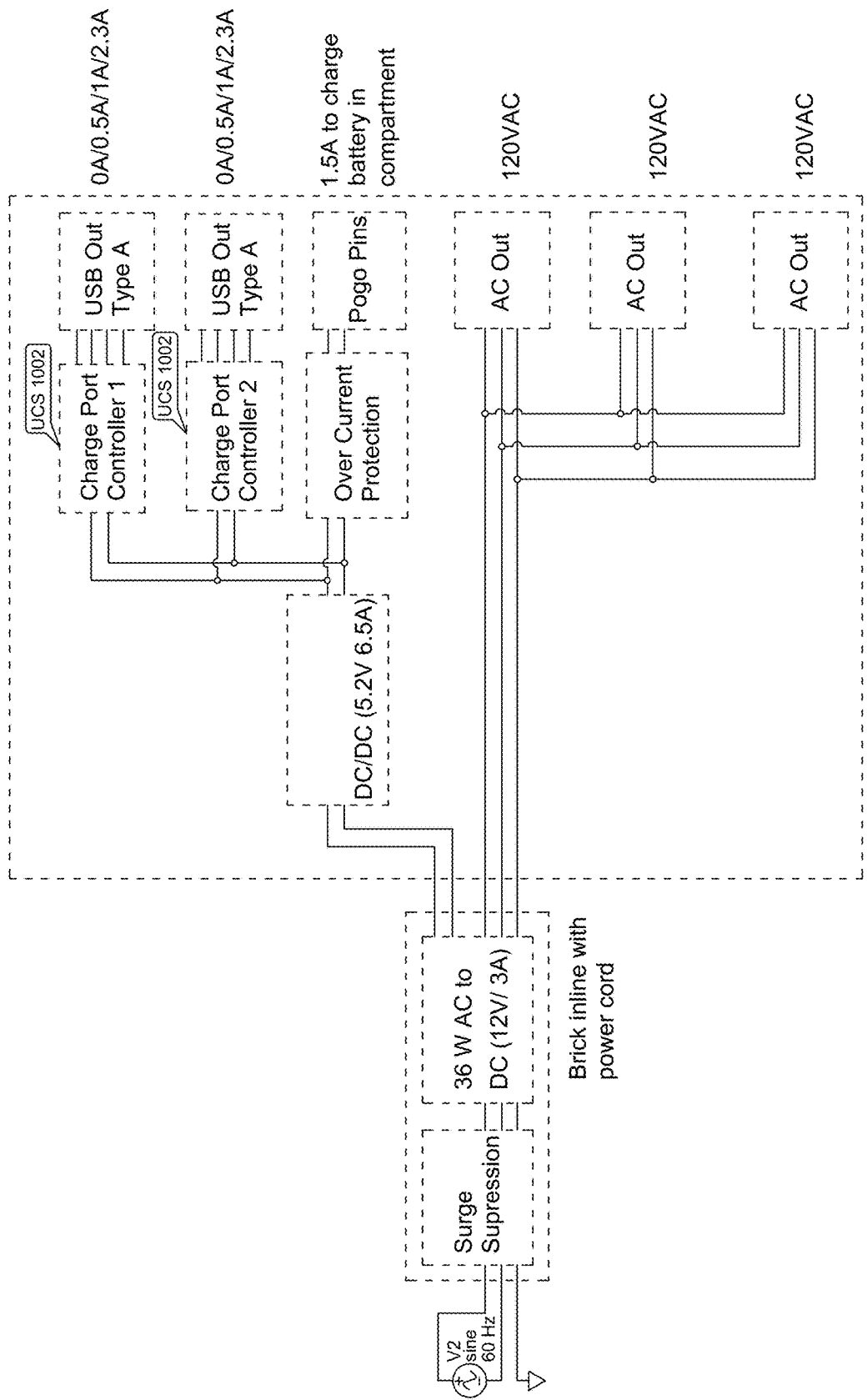
FIGS. 6A-6B depict exemplary circuit diagrams of the power strip component.
Figure 6B:
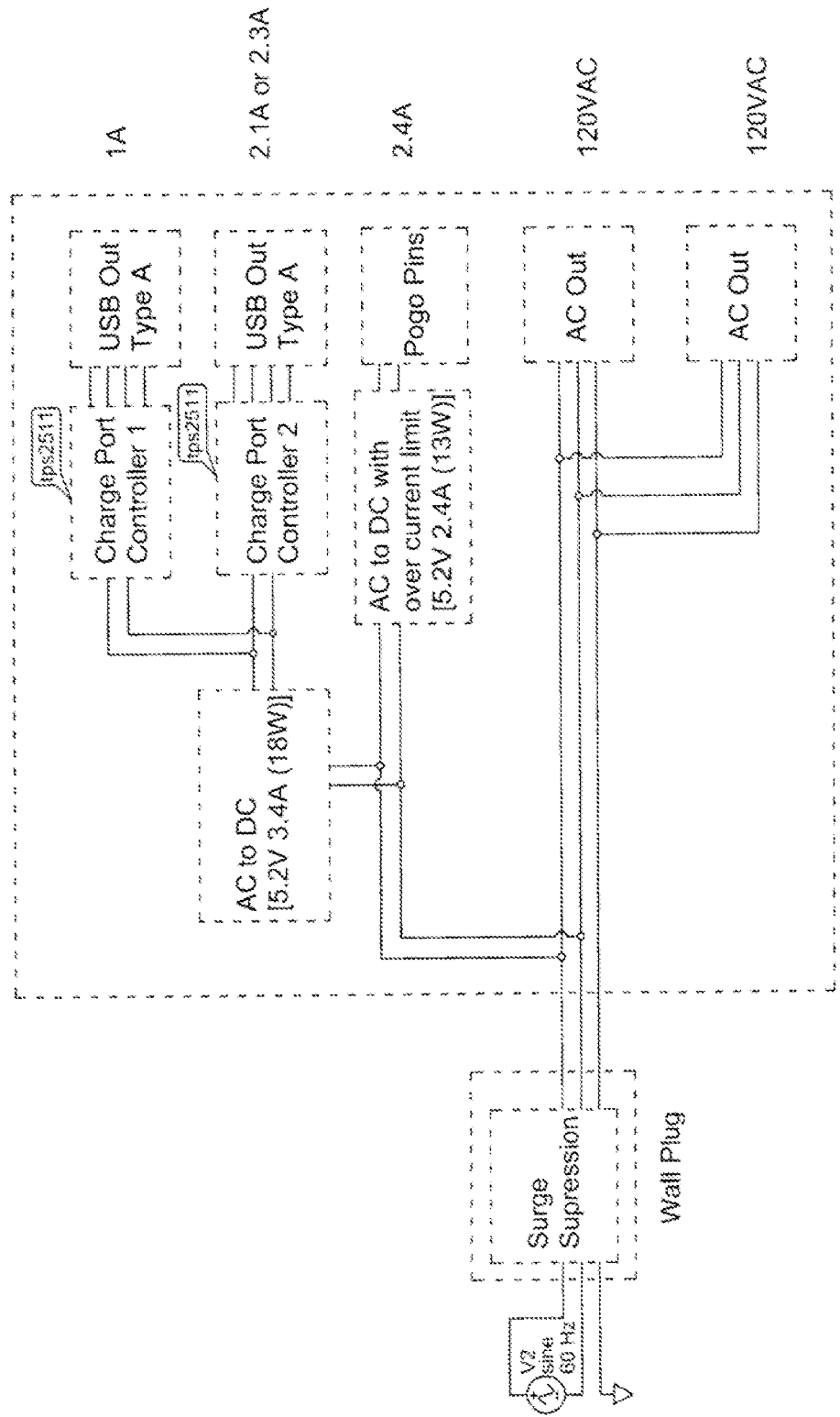

FIGS. 6A-6B depict exemplary circuit diagrams of the power strip component 120.

The power strip component 120, in an exemplary embodiment, may have approximate dimensions of 278 millimeters (mm) width, 75 mm depth, and 29 mm height. Exemplary construction of the power strip component 120 comprises a power strip housing made with a ThermoPlastic Elastomer (TPE) base. In another exemplary embodiment, the power strip housing may be of Acrylonitrile Butadiene Styrene (ABS) plastic, and may have silicone pads ("feet") for support located on a base of the power strip housing.

In an exemplary embodiment, the power strip component 120 comprises an indicator light 160 that provides a visual indication that the power strip component 120 is receiving electricity through the cord component 110. The power strip component 120 may comprise a power button 180 for turning "on" and "off" the electricity received through the cord component 110.

FIG. 7A depicts a perspective view of the battery 150. Exemplary embodiments of the battery 150 comprise at least one of a battery USB dedicated charge port 730, a pogo pin outlet (not shown), and the like for charging mobile devices, such as smartphones, tablets, laptops etc. The battery 150, when removed from the power strip component 120, enables a user to charge their mobile device without having the mobile device plugged into a wall electrical outlet. The mobile device is charged by transferring electricity from the battery 150 to the mobile device through one of the battery USB dedicated charge port and the battery pogo pin outlet.

That is, when the battery 150 is removed from the charging cavity 190 of the power strip component 120, a user can plug a mobile device into one of the USB dedicated charge port or pogo pin outlets to charge the mobile device without being connected to a wall electrical outlet. The battery USB dedicated charge port, in an exemplary embodiment, is a USB A outlet with 5.2V output at less than 2.5 A. The battery USB dedicated charge port comprises charge port emulation on D lines to support maximum mobile device charge rates. For example, similar to Dedicated Charging Port (DCP), Apple 5W and 10W/12W, YD/T 1591-2009.

Exemplary construction of the battery 150 comprises an ultrasonic welded plastic battery housing 710 partially made of ABS plastic, and/or a cold molded rubberized base. The battery 150 further comprises a battery indicator light 170 that provides a visual indication that the battery 150 is receiving electricity from the power strip component 120. The battery 150, in an exemplary embodiment, comprises a battery power button 720. The battery power button 720 turns "on" and "off" the electricity output from the battery 150.

In an exemplary embodiment, the battery 150 has an internal cell bank capacity of, for example, 4000-6000 mAh, and may comprise a Lithium-Ion Prismatic battery. In another exemplary embodiment, the battery 150 may comprise two 2000 mAh cells. Battery capacity may be 6000 mAh, or have a different capacity, especially as battery technology changes over time. The battery may have fuel gauging that doesn't require calibration. Those skilled in the art will understand that various other combinations of cells may be used, depending on the desired capacity of the battery.

FIG. 7B depicts an exemplary embodiment of the battery 150 comprising a fold-out wall plug 740 to enable charging of battery 150 by plugging into a wall electrical outlet, separate from power strip component 120. The fold-out wall plug 740 rotates on an axis both towards and away from the housing of the battery 150 such that the fold-out wall plug 740 extends at a right-angle with respect to the housing of the battery 150 when fully extended and rests flush and parallel to the housing of the battery 150 when fully retracted. In an exemplary embodiment, when the battery 150 is inserted into the charging cavity 190, the fold-out wall plug 740 is in a fully retracted position and connects with the power strip electrical contact 510 in the charging cavity 190 of the power strip component 120 and receives electricity for charging the battery 150.

In an exemplary embodiment, the fold-out wall plug may 740 be configured for various wall electrical outlet voltages, such as, for example, a North American standard 110 V plug, or a European standard 220 V plug.

In an exemplary embodiment, the battery 150 may not include the fold-out wall plug for separate charging. Also, an embodiment of the battery 150 may have a different number of USB dedicated charge ports (e.g., two), or may have no USB dedicated charge ports.

Figure 7C:
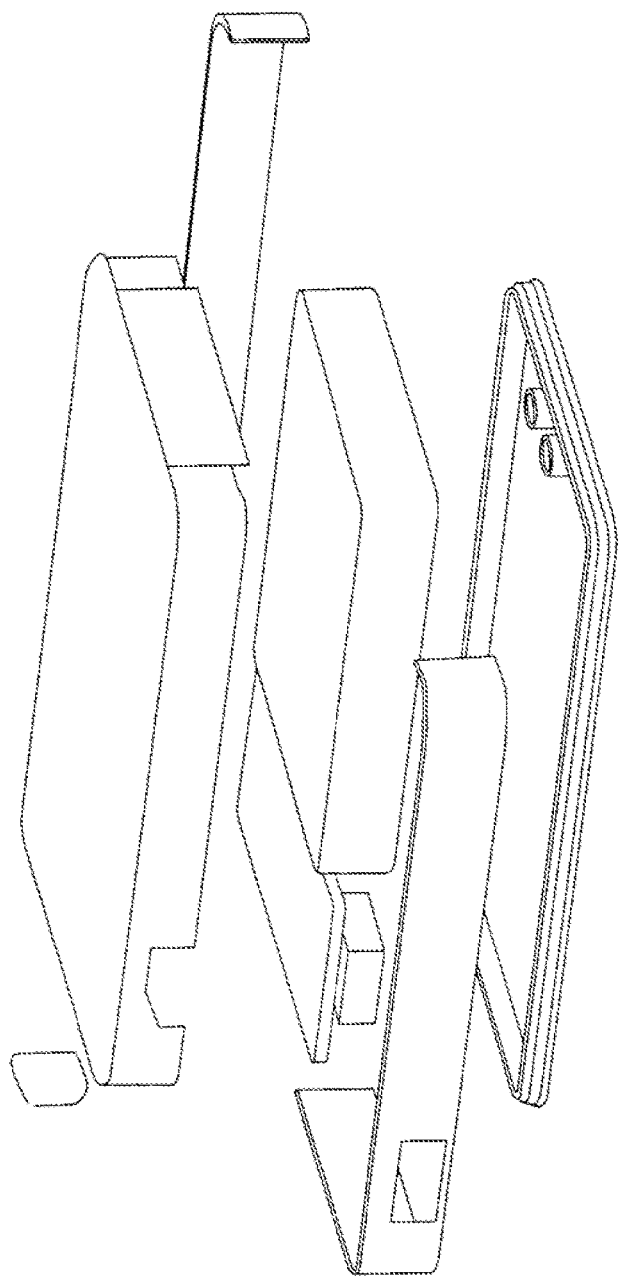

FIG. 7C depicts an exemplary embodiment of the battery 150, identifying parts, colors, materials and finishes. Part (1) is a top cover with a color of pantone Q716-1-1, made of a polycarbonate plastic, and finished with a matte (MT-11000) soft touch. Part (2) is a metal trim with a color of black, made of aluminum, and finished with an anodized black horizontal brush. Part (3) is an indicator light with a white Light Emitting Diode (LED). Part (4) is an indicator light button with a color of pantone Q716-1-1, made of polycarbonate plastic, and finished with a matte (MT-11000) soft touch. Part (5) is a bottom cover, i.e., base, with a color of pantone Q716-1-1, made of polycarbonate plastic, and finished with a matte (MT-11000) soft touch. Part (6) refers to charge connections made of copper and finished with aluminum. Part (7) is a USB dedicated charge port, with a color of black.

Figure 8:
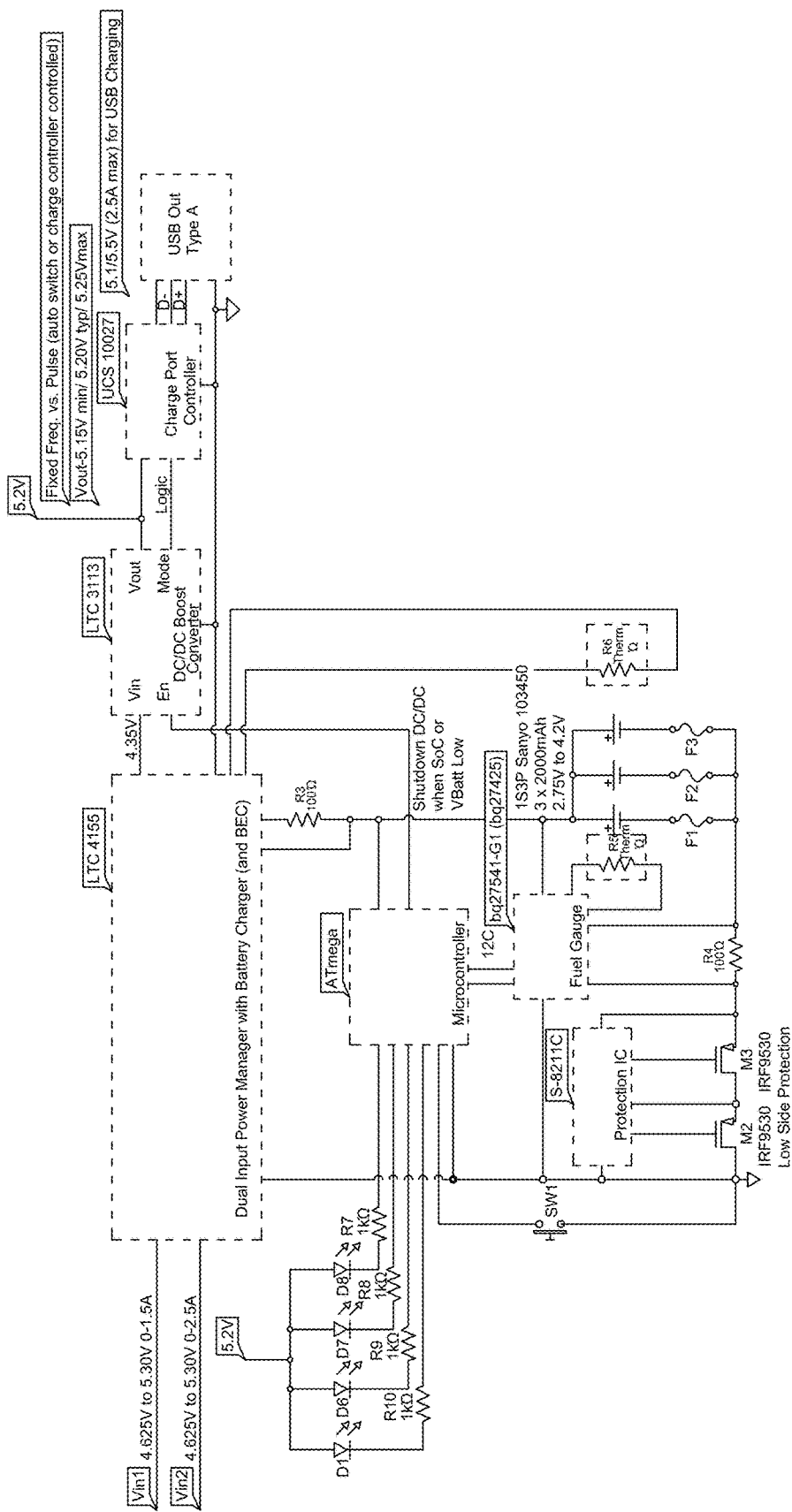
FIGS. 8-10 depict exemplary circuit diagrams of the battery.
Figure 9:
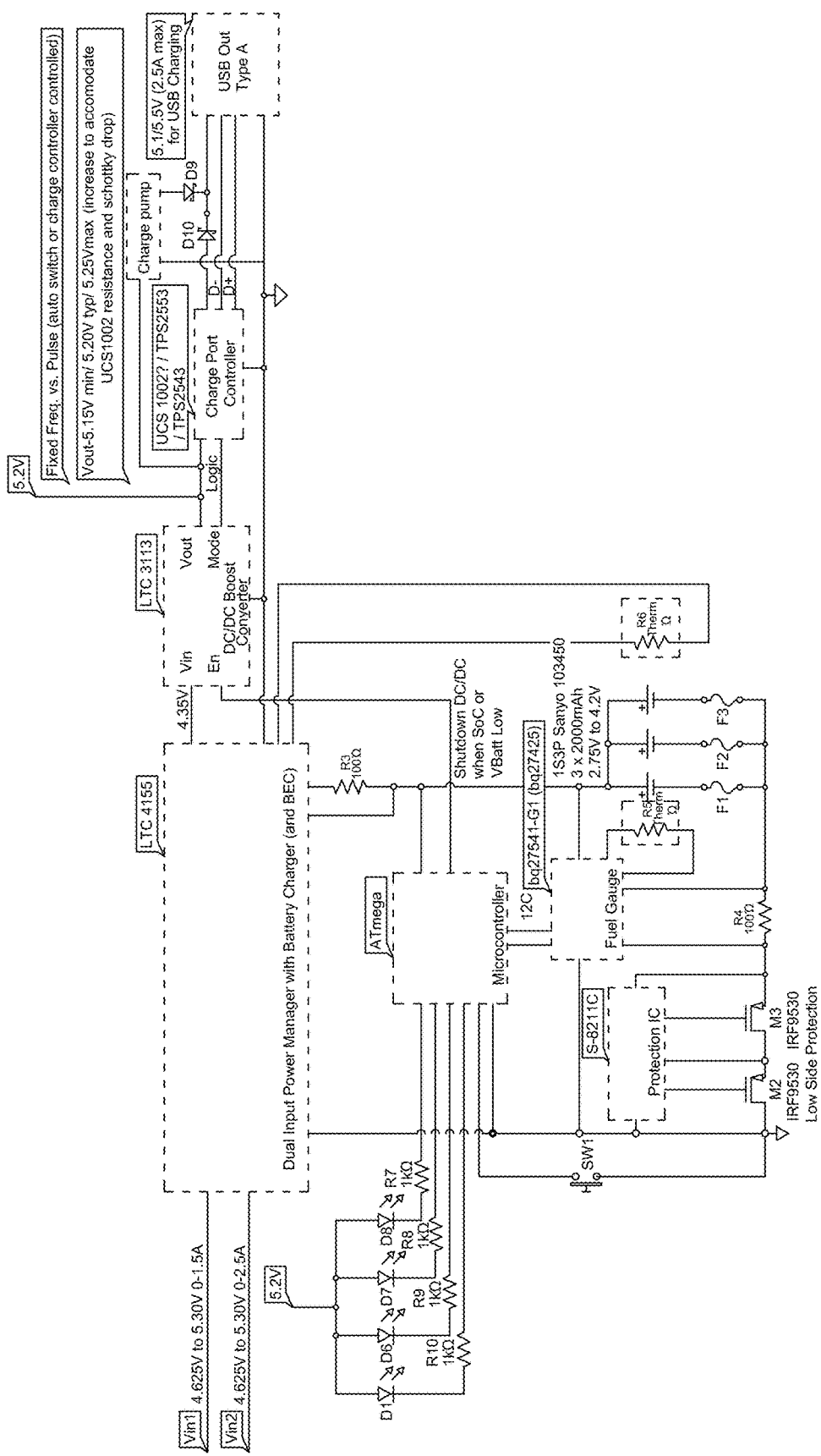
Figure 10:
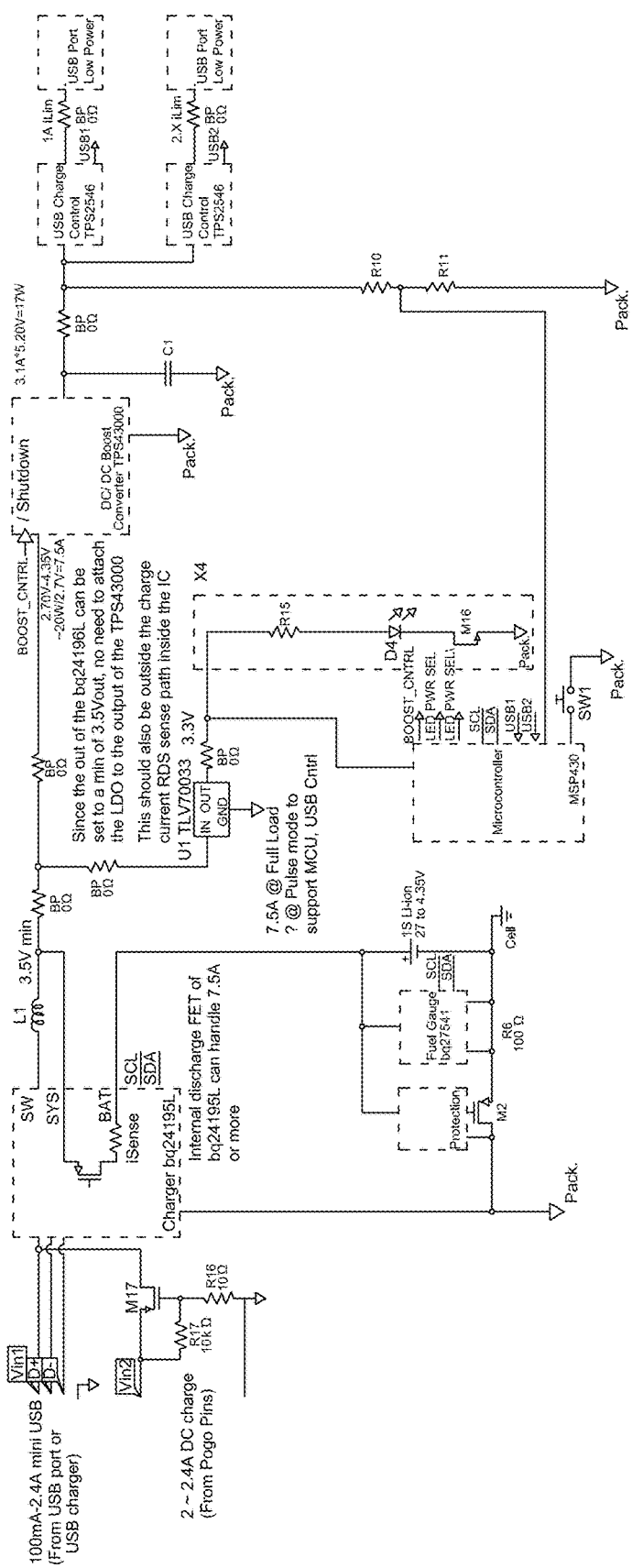

FIGS. 8-10 depict exemplary circuit diagrams of the battery 150. In an exemplary embodiment, the battery 150 comprises a DC to DC boost converter circuit; a charge port controller circuit; a microcontroller circuit; an input power management and charging circuit; and a protection circuit.

Figure 11:
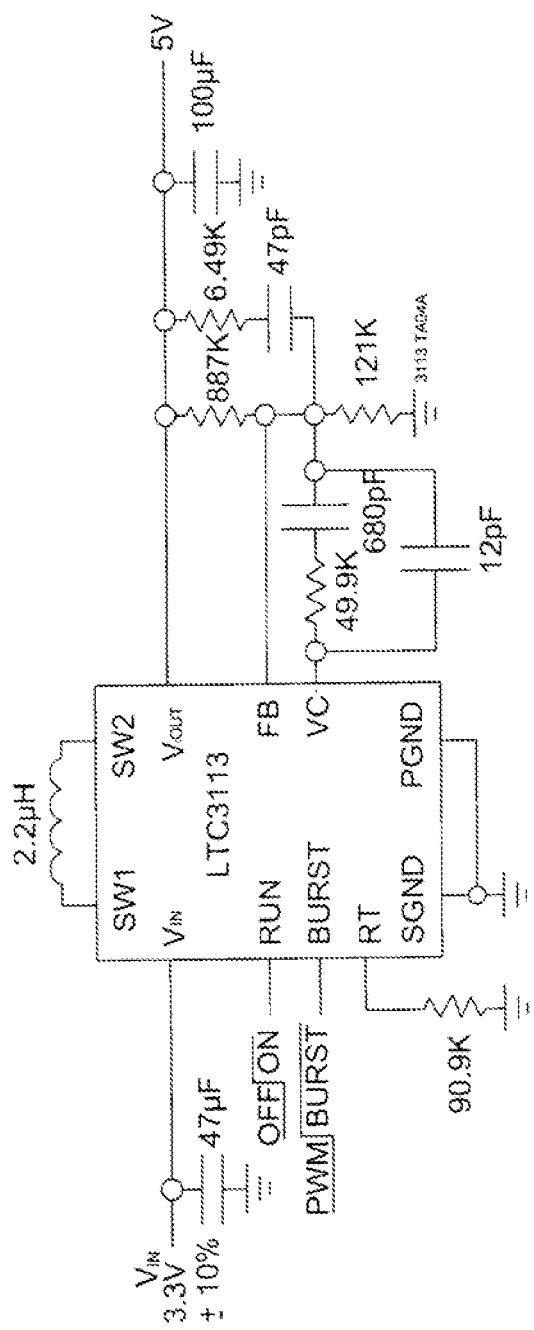
FIGS. 11-20 depict exemplary circuit diagrams of circuits used in construction of the battery.
Figure 12:
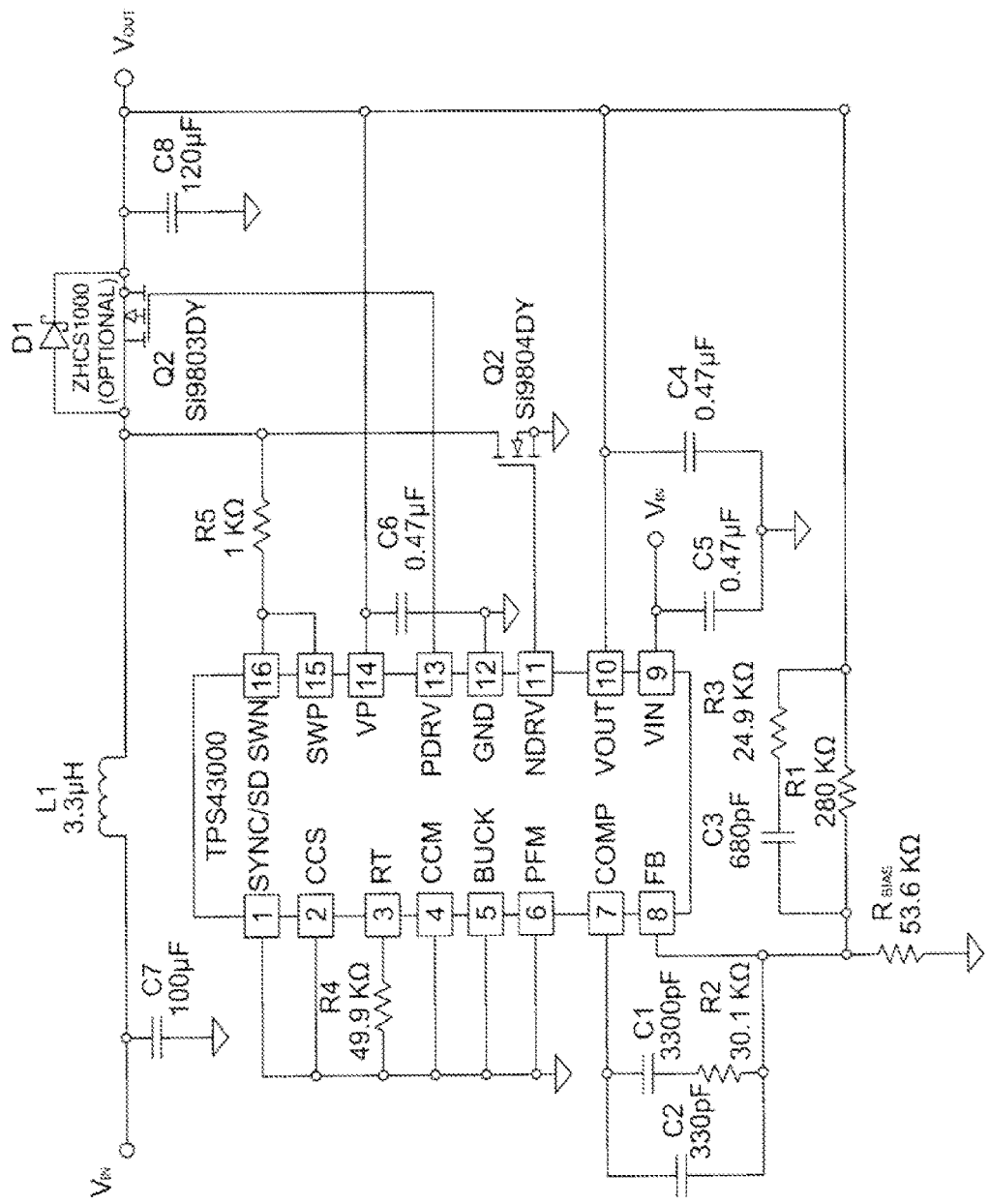

In an exemplary embodiment, a DC to DC boost converter circuit may be used in order to adjust the voltage of the battery 150 to a voltage required for charging through one of the USB dedicated charge port and the pogo pin outlet. In an exemplary embodiment, the DC to DC boost converter circuit adjusts the voltage to the approximately 5 V required for USB charging. Those skilled in the art will understand that various known components may be used for the DC to DC boost converter circuit, however, an exemplary DC to DC boost converter circuit comprises a Linear Tech LTC3113 circuit, as depicted in FIG. 11, or a Texas Instruments TPS43000, as depicted in FIG. 12.

Figure 13:
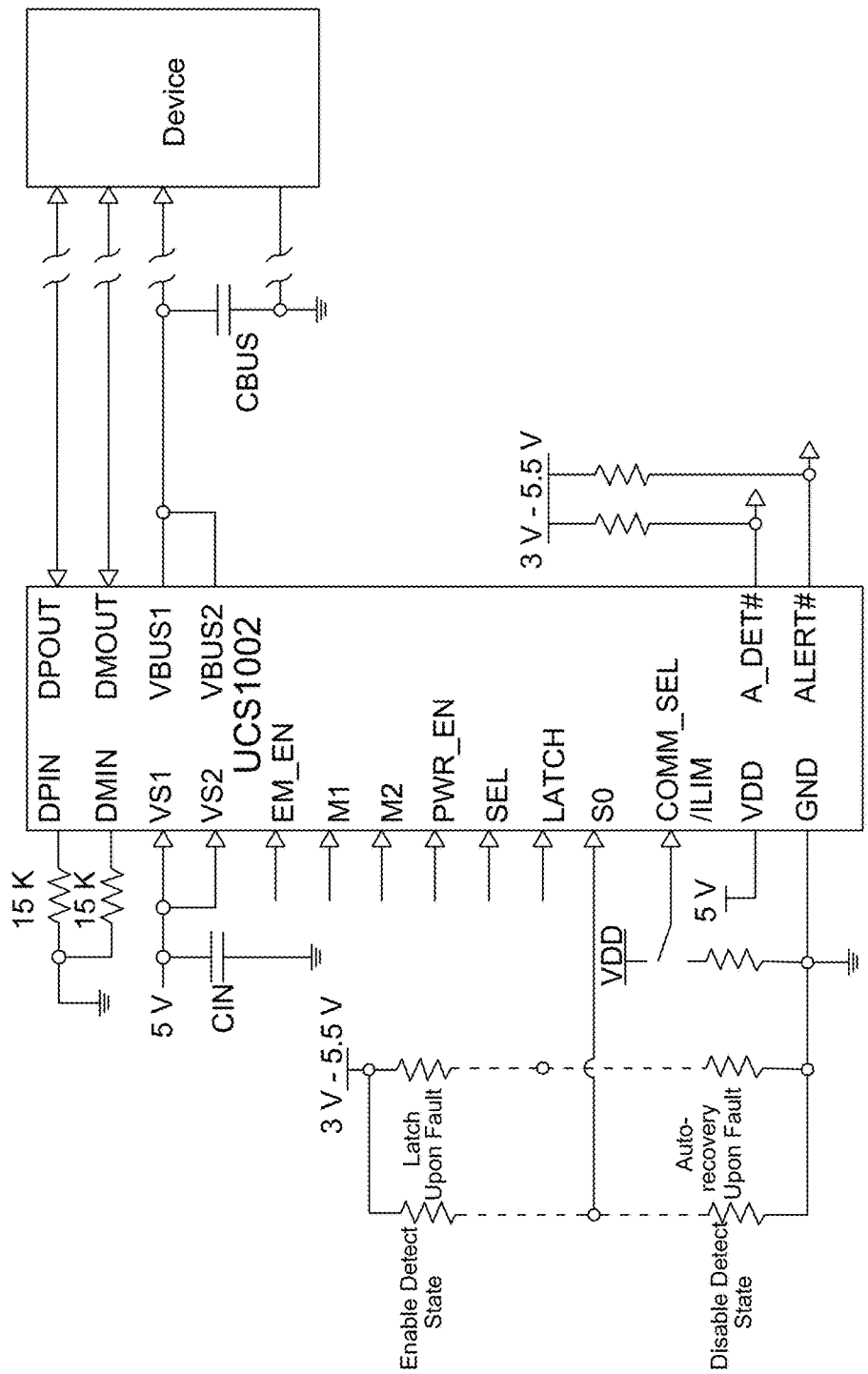
Figure 14:
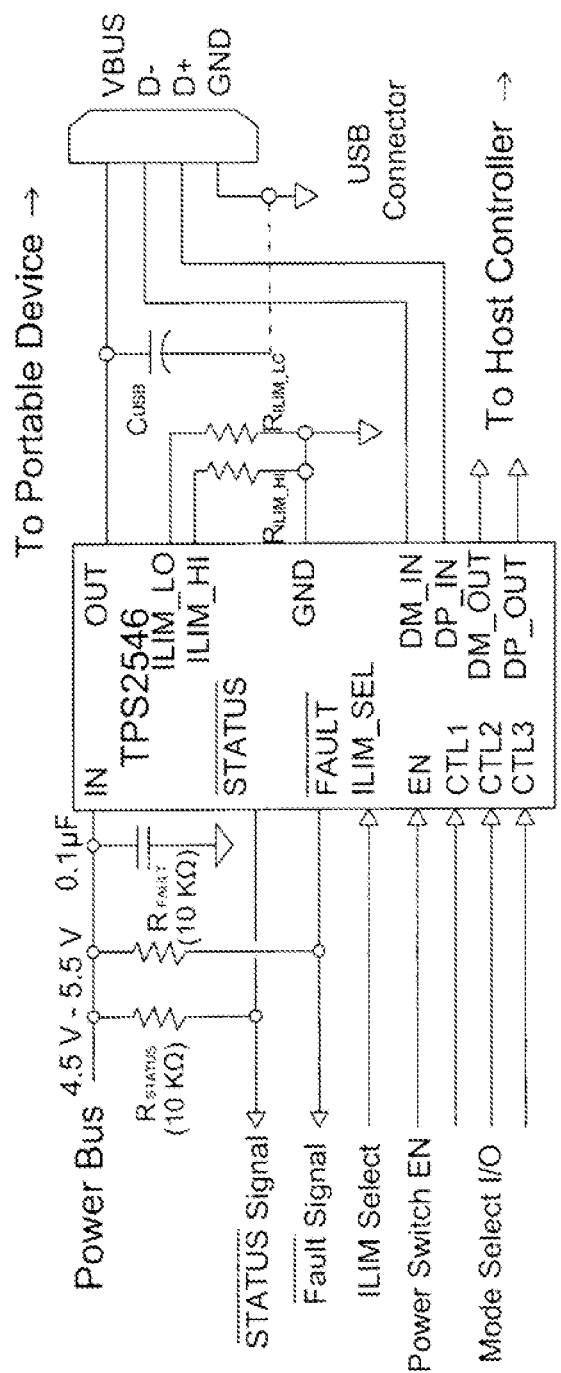

In an exemplary embodiment, the battery 150 comprises a charge port controller circuit. The charge port controller ensures optimal charge rates and supports charging compatibility of a wide range of mobile devices. Those skilled in the art will understand that various known components may be used for the charge port controller, however, an exemplary charge port controller circuit comprises a Smart Mixed-Signal Connectivity (SMSC) UCS100X, as depicted in FIG. 13, or a Texas Instruments TPS2546, as depicted in FIG. 14.

In an exemplary embodiment, the battery 150 comprises a microcontroller that manages a Graphical User Interface (GUI) and monitors power button input. The microcontroller also requests fuel gauge State-of Charge (SoC) data from a battery SoC measurement and charging status monitoring circuit, which monitors the battery 150's fuel gauge. The microcontroller controls the indicator light 170 based on the SoC data received from the battery SoC measurement and charging status monitoring circuit indicating a charging state of the battery 150. Those of ordinary skill will understand that various known components may be used for the microcontroller, however, an exemplary embodiment of the microcontroller comprises an Atmel ATmega circuit or a Texas Instruments MSP 430.

Figure 15:
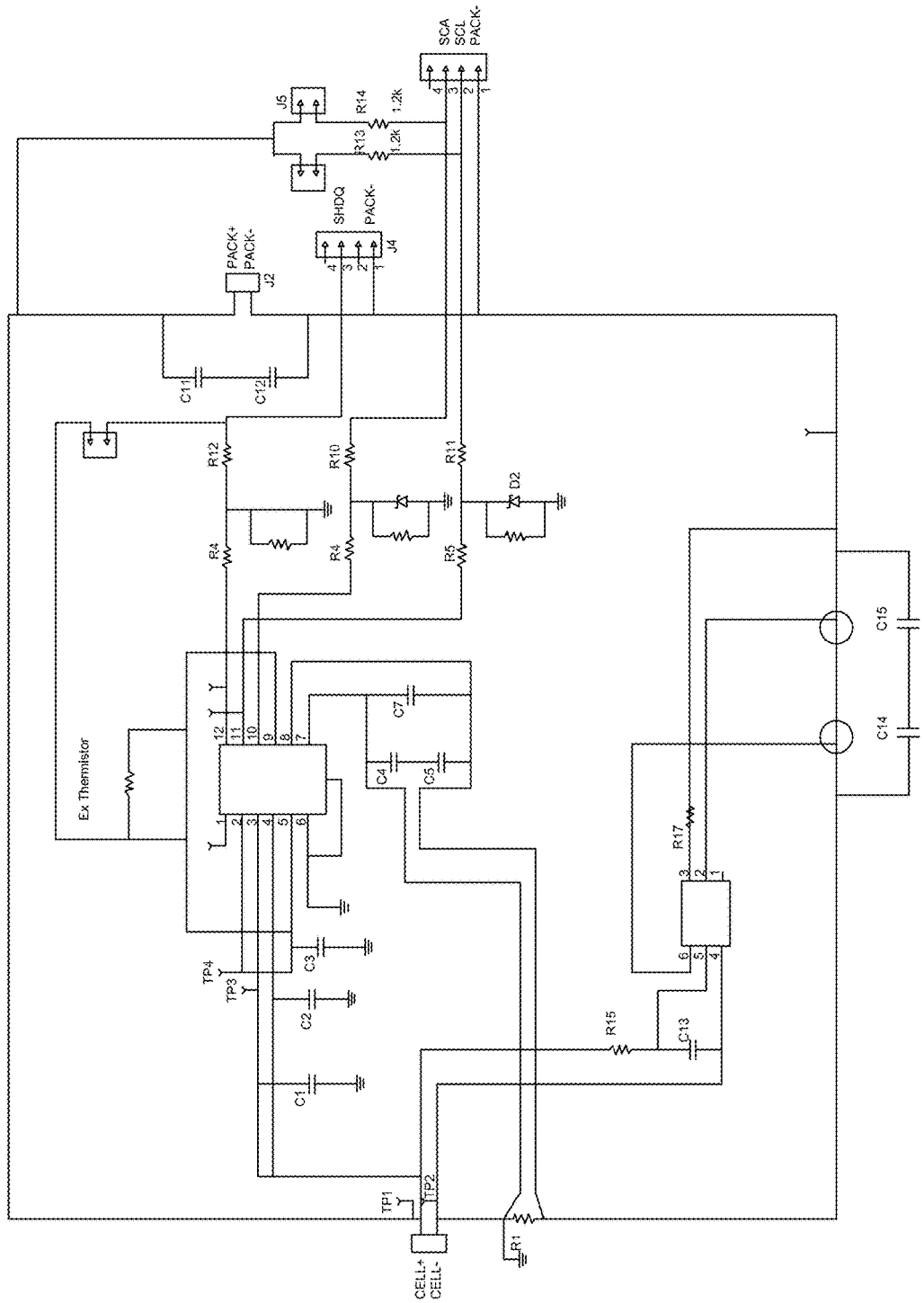
Figure 16:
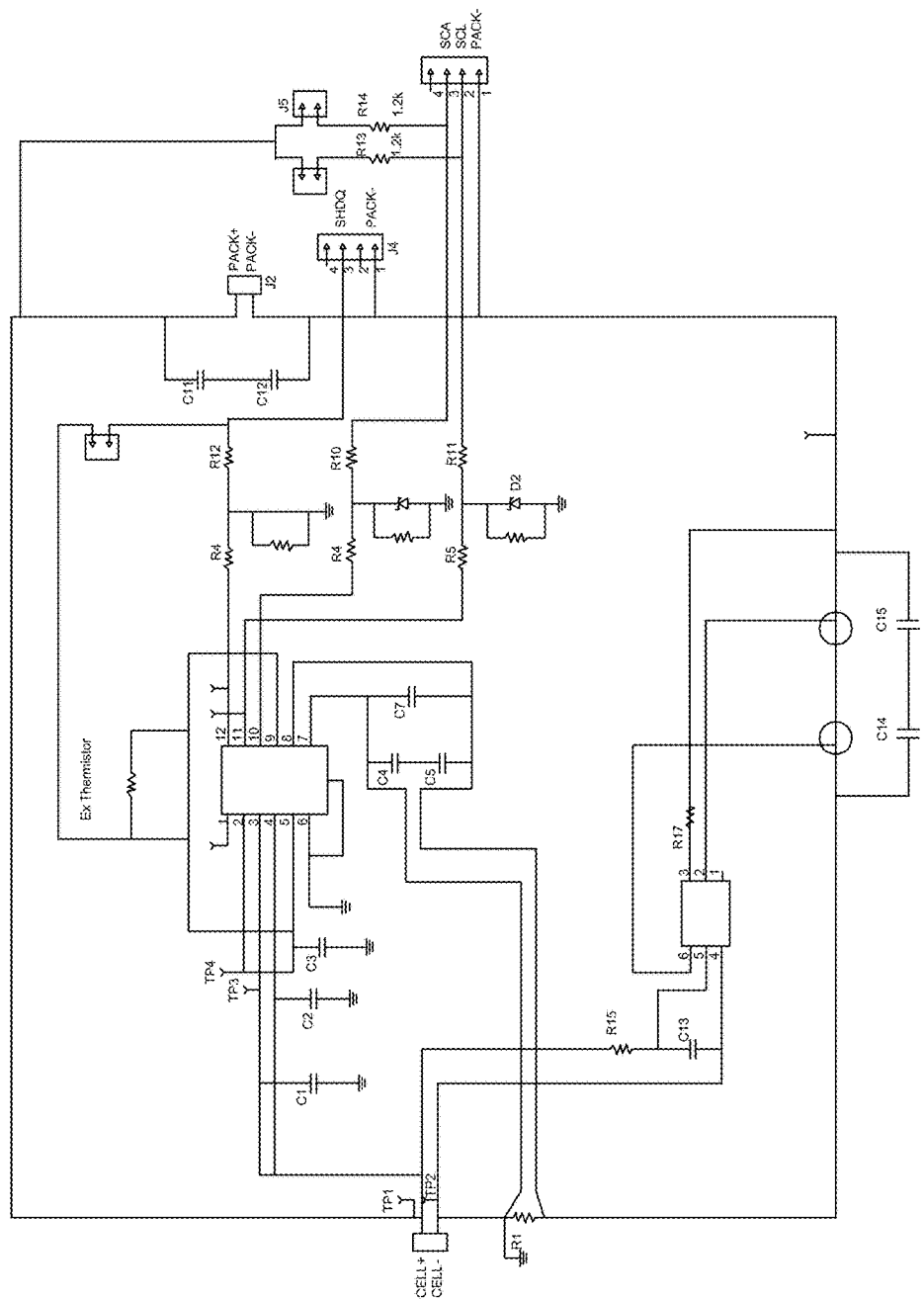

Those of ordinary skill will understand that various known components may be used for the battery SoC measurement and charging status monitoring circuit, however, an exemplary embodiment of the battery SoC measurement and charging status monitoring circuit comprises a Texas Instruments bq27541-g1, as depicted in FIG. 15, or a Texas Instruments bq27541-v200, as depicted in FIG. 16. When the SoC data indicates a low charging state, the DC to DC converter may be disabled.

In an exemplary embodiment, an input power management and charging circuit of the battery 150 is configured for prioritized pass-through power distribution. That is, when the battery 150 is being charged, either when connected to the power strip component 120 or plugged into a wall electrical outlet, as described herein, and a mobile device is connected to the battery USB dedicated charge port or the battery pogo pin outlet at the same time, electricity is passed through to the mobile device without passing through nodes of the battery 150. Electricity not consumed for charging the mobile device is used to charge the battery 150.

Figure 17:
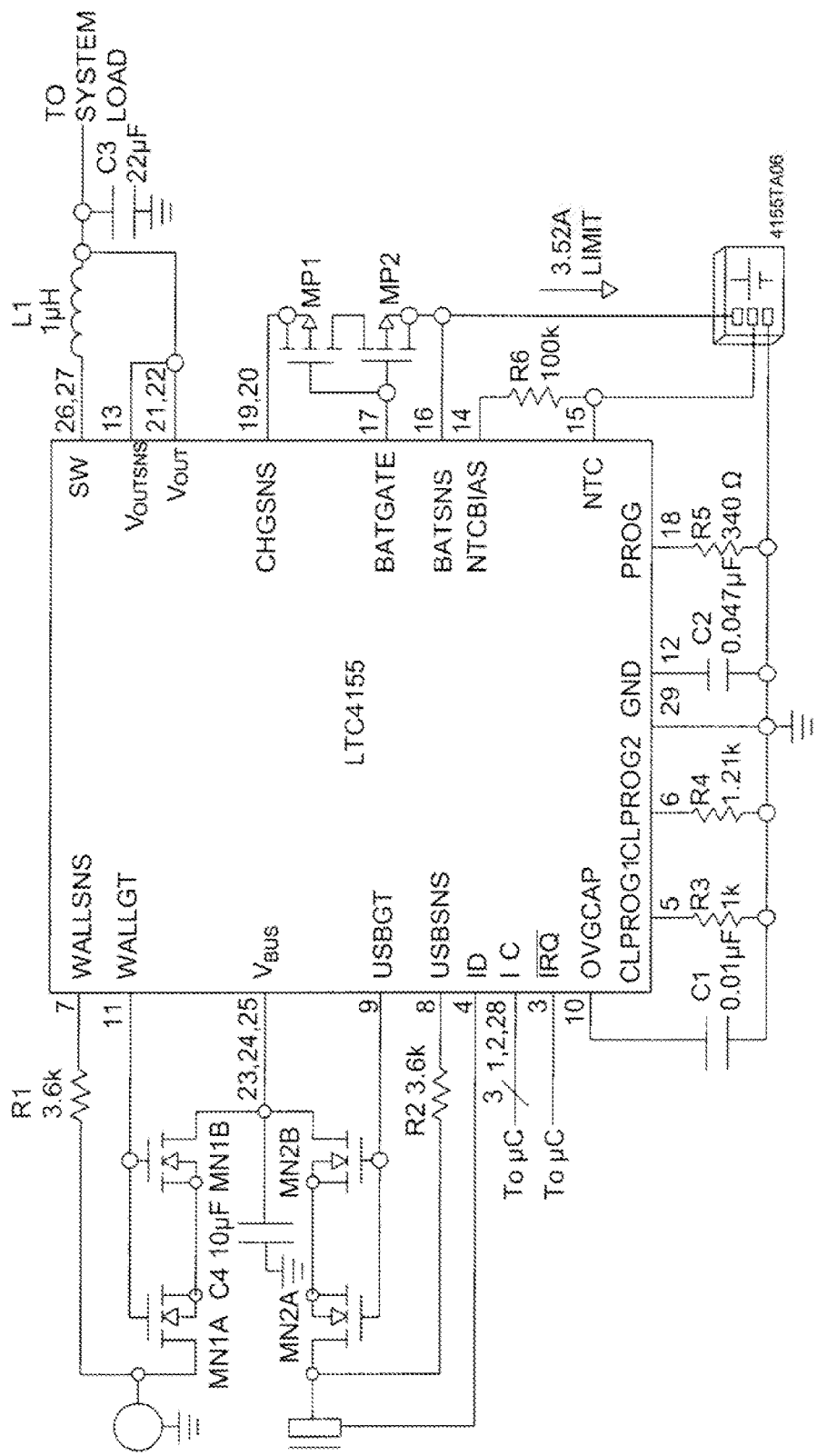
Figure 18:
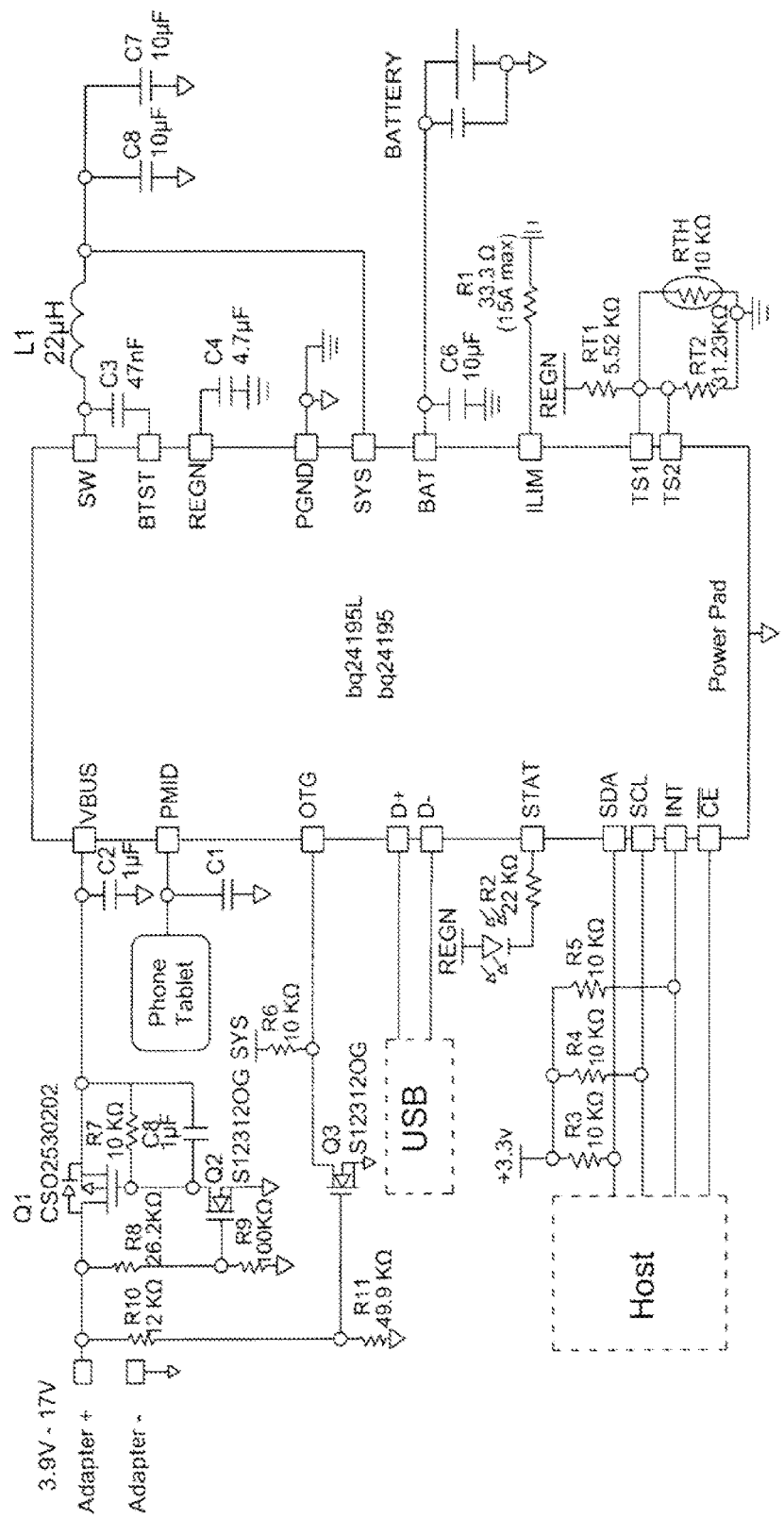

Those skilled in the art will understand that various known components may be used to enable prioritized pass-through functionality (and that some embodiments may have no pass-through functionality); however, an exemplary embodiment of the input power management and charging circuit comprises a Linear Technologies LTC4155 circuit, as depicted in FIG. 17, for dual input management, i.e., management of USB and pogo pin outlets, and pass-through power distribution. In an another exemplary embodiment, the input power management and charging circuit comprises a Texas Instruments bq24195L circuit, as depicted in FIG. 18, which provides; dual input management; charging for a 4.35 V Li-Ion cell; and discharge power path management and light boost capability, which adjusts cell voltage to 3.5 V during low voltage conditions.

Figure 19:
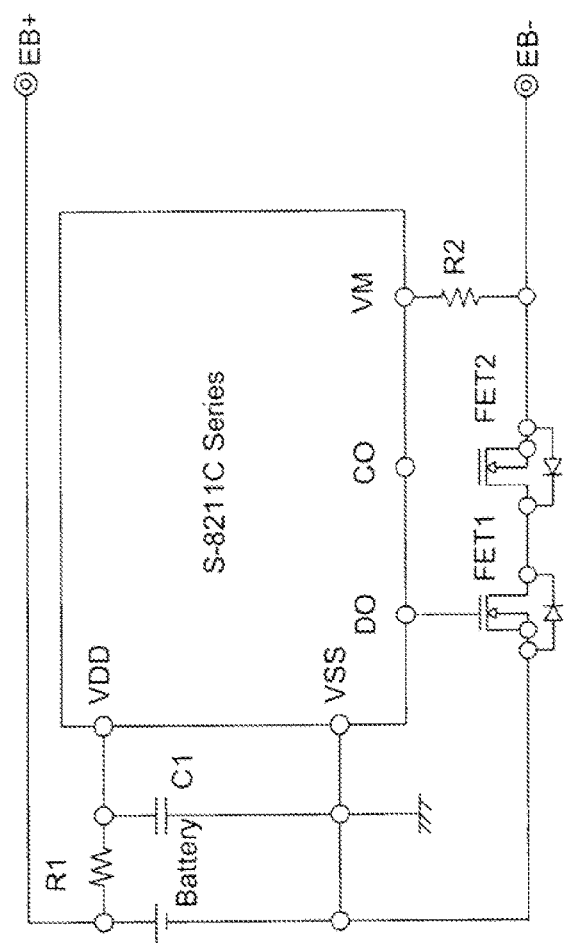
Figure 20:
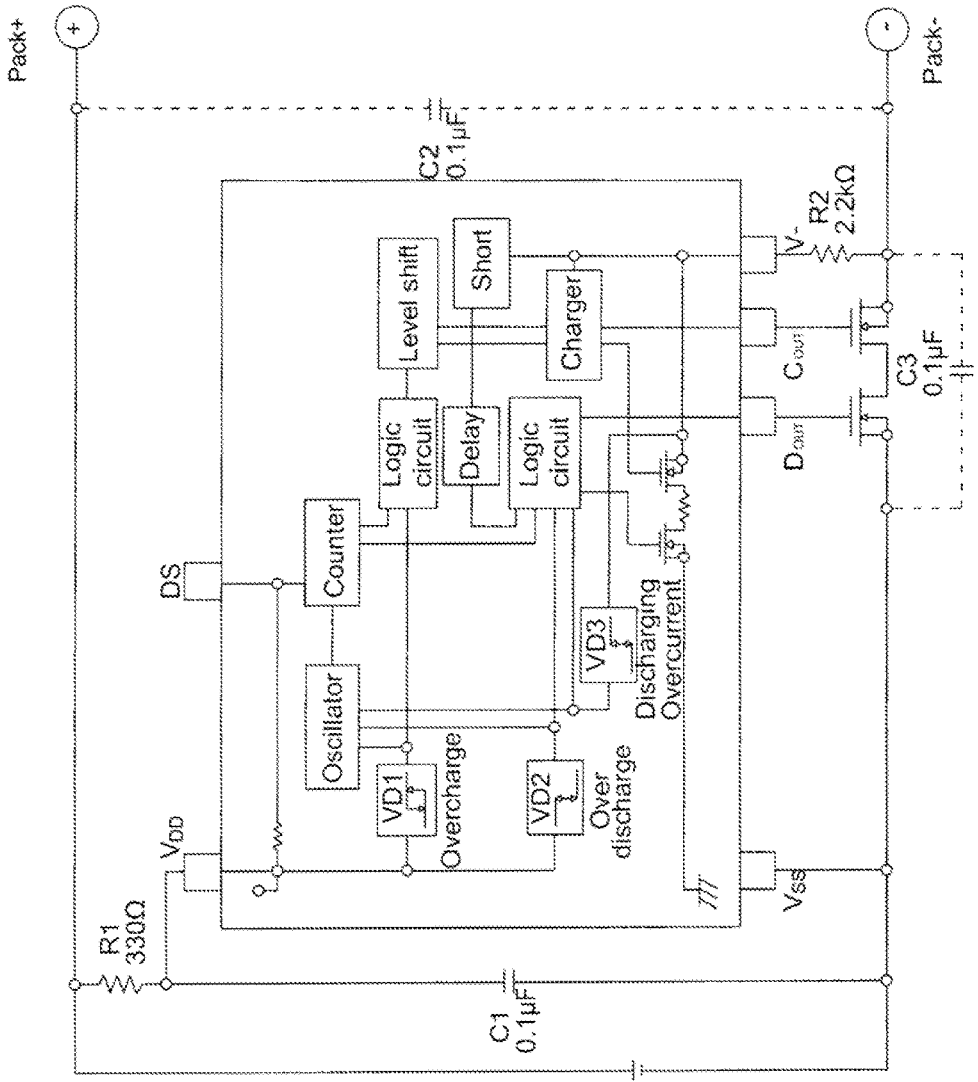

In an exemplary embodiment, the battery 150 comprises a protection circuit that prevents fault conditions from damaging the battery 150 and prevents thermal events, such as fire or explosion. Those skilled in the art will understand that various known components may be used for the protection circuit, however, an exemplary embodiment of the protection circuit comprises a Seiko S-8211C circuit, as depicted in FIG. 19, or a Mitsumi MM3280 circuit, as depicted in FIG. 20.

While the circuitry described above is, in an exemplary embodiment, located in the battery 150, other embodiments may have the circuitry located in the power strip component 120, or may have some circuitry in the power strip component 120 and some in the battery 150. Other exemplary embodiments of the battery 150 comprise the following features: impedance track fuel gauging; a microcontroller circuit and fuel gauge User Interface (UI); auto-on functionality such that no button needs to be pressed to charge a mobile device when connected; and low self-discharge.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

We claim:

1. An apparatus comprising:
a cord component connected to a plug component at a first end;
a power strip component connected to the cord component at a second end of the cord component;
the power strip component comprising at least one USB dedicated charge port and at least one AC outlet; and
the power strip component comprising a charging cavity, the charging cavity configured to accept and charge a battery that is separate from a device, the device configured to be powered by the battery, the battery comprising a dedicated charge port configured to charge the device by transferring electricity stored within the battery to the device when the battery is removed from the charging cavity.

2. The apparatus of claim 1, wherein the power strip component comprises an indicator light that provides a visual indication that the power strip component is receiving electricity through the cord component.

3. The apparatus of claim 1, wherein the power strip component comprises a power strip electrical contact comprising at least one of a leaf spring connector outlet, a blade connector outlet and a pogo pin outlet to charge the battery.

4. The apparatus of claim 1, wherein the power strip component comprises a power strip housing made of at least one of a Thermoplastic Elastomer (TPE) and Acrylonitrile Butadiene Styrene (ABS).

5. The apparatus of claim 1, wherein the power strip component comprises a power strip housing having silicone pads on a base of the power strip housing.

6. The apparatus of claim 1, wherein the battery comprises an indicator light that provides a visual indication that the battery is receiving electricity from the power strip component.

7. The apparatus of claim 1, wherein the dedicated charge port comprises a USB dedicated charge port, and wherein the battery comprises a battery electrical contact comprising at least one of a leaf spring connector receiving outlet, a blade connector receiving outlet and a pogo pin receiving outlet to charge the battery.

8. The apparatus of claim 1, wherein the battery comprises a fold-out wall plug to enable charging of the battery separate from the power strip component, the fold-out wall plug connecting with a power strip electrical contact when the battery is inserted into the charging cavity of the power strip component.

9. The apparatus of claim 1, wherein the battery comprises a DC to DC boost converter circuit, a charge port controller circuit, a microcontroller circuit, an input power management and charging circuit, and a protection circuit.

10. The apparatus of claim 1, further comprising:
a spring loading mechanism located within the charging cavity of the power strip component, wherein the spring loading mechanism is in a locked position when the battery is pressed into the charging cavity of the power strip component, and wherein the battery is released and lifted out of the charging cavity when the spring loading mechanism is activated.

* * * * *